United States Patent
Liu et al.

(10) Patent No.: US 11,825,416 B2
(45) Date of Patent: Nov. 21, 2023

(54) SKIPPING DOWNLINK FREQUENCY HOPS IN UNLICENSED FREQUENCY BAND

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/091,343

(22) Filed: Nov. 6, 2020

(65) Prior Publication Data

US 2021/0160780 A1    May 27, 2021

Related U.S. Application Data

(60) Provisional application No. 62/940,139, filed on Nov. 25, 2019.

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0012* (2013.01); *H04W 52/0219* (2013.01);
(Continued)

(58) Field of Classification Search
CPC ......... H04W 52/0235; H04W 52/0219; H04W 72/02; H04W 72/042; H04W 72/0453;
(Continued)

(56) References Cited

U.S. PATENT DOCUMENTS 7,280,580 B1 *  10/2007  Haartsen .............. H04B 1/7143
                                                    375/138
2012/0099500 A1 *  4/2012  Park .................. H04W 52/0235
                                                    370/311
(Continued)

FOREIGN PATENT DOCUMENTS

EP         3340500 A1 *  6/2018  .............. H04J 11/00
WO    WO-2016129959 A1    8/2016
(Continued)

OTHER PUBLICATIONS

International Search Report and Written Opinion—PCT/US2020/059620—ISA/EPO—dated Feb. 22, 2021.

*Primary Examiner* — Ian N Moore
*Assistant Examiner* — Latresa A McCallum
(74) *Attorney, Agent, or Firm* — Arun Swain

(57) ABSTRACT

This disclosure provides systems, methods and apparatus, including computer programs encoded on computer storage media, for narrowband communications using frequency hopping. In some implementations, a user equipment (UE) may receive a discovery reference signal (DRS) including a skipping signal identifying one or more UEs, may stay on an anchor channel when the skipping signal identifies the UE, and may switch from the anchor channel to a first downlink (DL) hopping channel of a DL frequency hopping pattern when the signal does not identify the UE. In some other implementations, a base station (BS) may be configured to output a DRS including a skipping signal identifying one or more UEs, output a signal indicating a channel occupancy time (COT) obtained on a first DL hopping channel of a DL frequency hopping pattern, and output DL data on the first DL hopping channel of the DL frequency hopping pattern.

27 Claims, 12 Drawing Sheets

(51) Int. Cl.
   *H04W 72/02*      (2009.01)
   *H04W 72/0453*    (2023.01)
   *H04W 72/23*      (2023.01)

(52) U.S. Cl.
   CPC ....... *H04W 72/02* (2013.01); *H04W 72/0453* (2013.01); *H04W 72/23* (2023.01)

(58) Field of Classification Search
   CPC .... H04W 72/046; H04W 16/28; H04L 5/0012
   See application file for complete search history.

(56) References Cited

U.S. PATENT DOCUMENTS

| | | | |
|---|---|---|---|
| 2013/0208637 A1* | 8/2013 | Abraham | H04W 74/06 370/312 |
| 2018/0359715 A1* | 12/2018 | Abedini | H04L 5/0048 |
| 2019/0215781 A1* | 7/2019 | Jeon | H04W 24/10 |
| 2019/0215807 A1* | 7/2019 | Hwang | H04L 27/2602 |
| 2020/0220682 A1* | 7/2020 | Li | H04L 5/0048 |
| 2020/0314815 A1 | 10/2020 | Kim et al. | |
| 2020/0322807 A1* | 10/2020 | Si | H04W 16/14 |
| 2021/0218525 A1* | 7/2021 | Liu | H04L 5/0048 |

FOREIGN PATENT DOCUMENTS

| | | | | |
|---|---|---|---|---|
| WO | WO-2018106841 A1 | | 6/2018 | |
| WO | WO-2018144942 A1 | * | 8/2018 | ........... H04B 1/7136 |
| WO | WO-2018191538 A1 | | 10/2018 | |
| WO | WO-2019062778 A1 | | 4/2019 | |
| WO | WO-2019140060 A1 | | 7/2019 | |
| WO | WO-2020063831 A1 | | 4/2020 | |

\* cited by examiner

SKIPPING DOWNLINK FREQUENCY HOPS IN UNLICENSED FREQUENCY BAND

CROSS-REFERENCE TO RELATED APPLICATION

This Patent Application claims priority to U.S. Provisional Patent Application No. 62/940,139 entitled "SKIPPING DOWNLINK FREQUENCY HOPS IN NR-U LITE" and filed on Nov. 25, 2019, which is assigned to the assignee hereof. The disclosures of all prior Applications are considered part of and are incorporated by reference in this Patent Application.

TECHNICAL FIELD

This disclosure relates generally to wireless communications and, more specifically, to wireless communications using frequency hopping techniques in unlicensed frequency bands.

DESCRIPTION OF THE RELATED TECHNOLOGY

Wireless communications systems are capable of supporting communications with multiple users by sharing portions of a system bandwidth using a multiple-access technology such as code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a user equipment (UE), and may include receiving a receiving a discovery reference signal (DRS) including a skipping signal identifying one or more UEs. The method also may include staying on an anchor channel when the skipping signal identifies the UE, and switching from the anchor channel to a first downlink (DL) hopping channel of a DL frequency hopping pattern when the signal does not identify the UE. In some implementations, the one or more UEs identified by the skipping signal may be permitted to enter a low-power state for one or more DRS periods. The DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In addition, or in the alternative, the DRS may indicate the DL frequency hopping pattern.

In some implementations, the skipping signal may indicate an absence queued DL data for each of the one or more identified UEs during one or more DRS periods. In other implementations, the skipping signal may be included in a reduced remaining minimum system information (RMSI) field of the DRS. In some instances, the RMSI field may include a bitmap identifying the one or more UEs. In some other implementations, the skipping signal may be included in a frequency domain resource assignment (FDRA) field of a downlink control information (DCI) message. In some other implementations, the skipping signal may be indicated by a slot format indicator (SFI) format index carried by the DRS.

In some implementations, the method also may include detecting a presence of UL data buffered in the UE, and selecting an UL frequency hopping pattern based at least in part on the DL frequency hopping pattern and an identifier unique to the UE. In some instances, the method may also include switching to a first UL hopping channel of the UL frequency hopping pattern based on detecting the presence of the buffered UL data, and transmitting the buffered UL data on the first UL hopping channel of the UL frequency hopping pattern. In some other instances, the first UL hopping channel of the UL frequency hopping pattern may correspond to one of a configured grant (CG) configuration or a physical random access channel (PRACH).

In some implementations, the method also may include returning to the first DL hopping channel of the DL frequency hopping pattern, and monitoring the first DL hopping channel of the DL frequency hopping pattern for one of an UL re-transmission grant or a random access response (RAR). In some other implementations, the method also may include detecting a signal indicating a channel occupancy time (COT) obtained by a base station on the first DL hopping channel of the DL frequency hopping pattern, and receiving DL data on the first DL hopping channel of the DL frequency hopping pattern.

Another innovative aspect of the subject matter described in this disclosure can be implemented in a UE. The UE may include a processing system and an interface. The interface may be configured to obtain a DRS including a skipping signal identifying one or more UEs. The interface also may be configured to stay on an anchor channel when the skipping signal identifies the UE, and to switch from the anchor channel to a first downlink (DL) hopping channel of a DL frequency hopping pattern when the signal does not identify the UE. In some implementations, the one or more UEs identified by the skipping signal may be permitted to enter a low-power state for one or more DRS periods. The DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In addition, or in the alternative, the DRS may indicate the DL frequency hopping pattern.

In some implementations, the skipping signal may indicate an absence queued DL data for each of the one or more identified UEs during one or more DRS periods. In other implementations, the skipping signal may be included in a reduced remaining minimum system information (RMSI) field of the DRS. In some instances, the RMSI field may include a bitmap identifying the one or more UEs. In some other implementations, the skipping signal may be included in a frequency domain resource assignment (FDRA) field of a downlink control information (DCI) message. In some other implementations, the skipping signal may be indicated by a slot format indicator (SFI) format index carried by the DRS.

In some implementations, the UE also may detect a presence of UL data buffered in the UE, and may select an UL frequency hopping pattern based at least in part on the DL frequency hopping pattern and an identifier unique to the UE. In some instances, the UE also may switch to a first UL hopping channel of the UL frequency hopping pattern based on detecting the presence of the buffered UL data, and may transmit the buffered UL data on the first UL hopping channel of the UL frequency hopping pattern. In some other instances, the first UL hopping channel of the UL frequency hopping pattern corresponds to one of a configured grant (CG) configuration or a physical random access channel (PRACH).

In some implementations, the UE also may return to the first DL hopping channel of the DL frequency hopping pattern, and may monitor the first DL hopping channel of the DL frequency hopping pattern for one of an UL re-transmission grant or a random access response (RAR). In some other implementations, the UE also may detect a signal indicating a channel occupancy time (COT) obtained by a base station on the first DL hopping channel of the DL frequency hopping pattern, and may receive DL data on the first DL hopping channel of the DL frequency hopping pattern.

Another innovative aspect of the subject matter described in this disclosure can be implemented as a method for wireless communication. The method may be performed by an apparatus of a base station (BS), and may include transmitting a DRS including a skipping signal identifying one or more UEs. The method also may include transmitting a signal indicating a COT obtained on a first DL hopping channel of a DL frequency hopping pattern, and transmitting DL data on the first DL hopping channel of the DL frequency hopping pattern. In some implementations, the one or more UEs identified by the skipping signal may be permitted to enter a low-power state for one or more DRS periods. The DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In addition, or in the alternative, the DRS may indicate the DL frequency hopping pattern.

In some implementations, the skipping signal may indicate an absence queued DL data for each of the one or more identified UEs during one or more DRS periods. In other implementations, the skipping signal may be included in a reduced remaining minimum system information (RMSI) field of the DRS. In some instances, the RMSI field may include a bitmap identifying the one or more UEs. In some other implementations, the skipping signal may be included in a frequency domain resource assignment (FDRA) field of a downlink control information (DCI) message. In some other implementations, the skipping signal may be indicated by a slot format indicator (SFI) format index carried by the DRS.

Another innovative aspect of the subject matter described in this disclosure can be implemented in a base station. The base station may include an interface configured to output for transmission a discovery reference signal (DRS) including a skipping signal identifying one or more user equipment (UEs). The interface also may be configured to output for transmission a signal indicating a channel occupancy time (COT) obtained on a first downlink (DL) hopping channel of a DL frequency hopping pattern. The interface also may be configured to output for transmission DL data on the first DL hopping channel of the DL frequency hopping pattern. In some implementations, the one or more UEs identified by the skipping signal may be permitted to enter a low-power state for one or more DRS periods. The DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In addition, or in the alternative, the DRS may indicate the DL frequency hopping pattern.

In some implementations, the skipping signal may indicate an absence queued DL data for each of the one or more identified UEs during one or more DRS periods. In other implementations, the skipping signal may be included in a reduced remaining minimum system information (RMSI) field of the DRS. In some instances, the RMSI field may include a bitmap identifying the one or more UEs. In some other implementations, the skipping signal may be included in a frequency domain resource assignment (FDRA) field of a downlink control information (DCI) message. In some other implementations, the skipping signal may be indicated by a slot format indicator (SFI) format index carried by the DRS.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
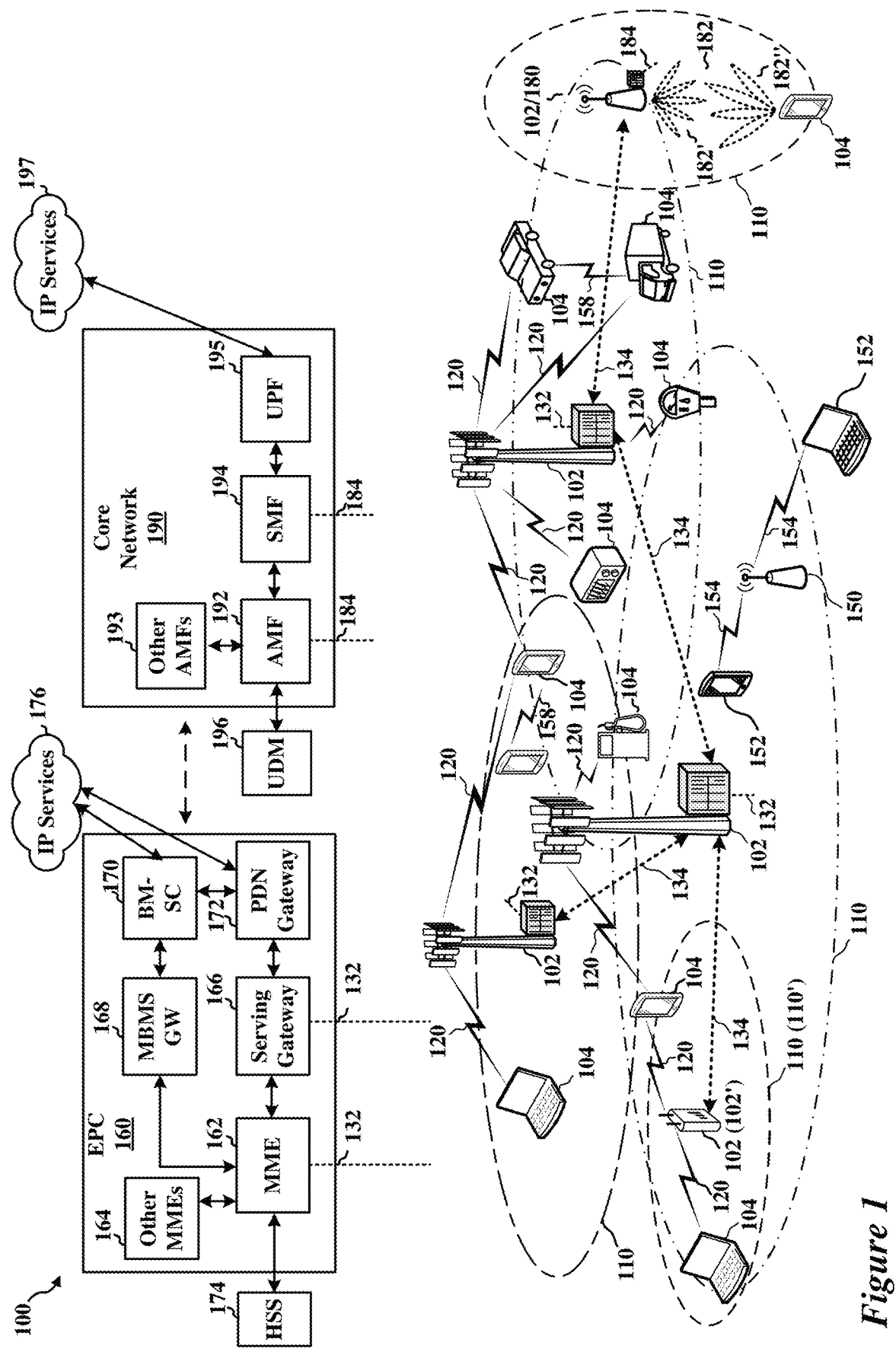
FIG. 1 shows a diagram illustrating an example wireless communications system and access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an Internet of things (IOT) network.

Implementations of the subject matter described in this disclosure may allow user equipments (UEs) and base stations (BSs) operating according to 5G NR protocols to exchange data and other information using narrowband communications with frequency hopping in an unlicensed frequency band. In accordance with some aspects of the present disclosure, a base station and a UE may exchange downlink (DL) data using a DL frequency hopping pattern and may exchange uplink (UL) data using an UL frequency hopping pattern. The DL frequency hopping pattern may include a sequence of DL hopping channels, and the UL frequency hopping pattern may include a sequence of UL hopping channels different than the sequence of DL hopping channels. Each DL hopping channel of the sequence of DL hopping channels may be associated with a corresponding DL hopping frame of a sequence of DL hopping frames, and each UL hopping channel of the sequence of UL hopping channels may be associated with a corresponding UL hopping frame of a sequence of UL hopping frames. In some implementations, each DL hopping channel of the sequence of DL hopping channels may be separated from a corresponding UL hopping channel of the sequence of UL hopping channels by a gap frequency configured or selected to reduce interference between DL and UL transmissions.

In some implementations, the base station may transmit a discovery reference signal (DRS) including a skipping signal identifying one or more UEs. The UE may receive the DRS, and determine whether the skipping signal identifies the UE. In some implementations, the DRS may indicate the DL frequency hopping pattern. The UE may select an uplink (UL) frequency hopping pattern for transmitting UL data to the base station. In some implementations, the UL frequency hopping pattern may be selected in response to the DL frequency hopping pattern and an identifier unique to the UE (such as a UE ID). In some other implementations, the UL frequency hopping pattern may be selected in response to the DL frequency hopping pattern and a cell-specific identifier.

When the skipping signal does not identify the UE, the UE may jump to the first DL hopping channel of the DL frequency hopping pattern. The UE may detect a signal indicating a channel occupancy time (COT) obtained by the base station on the first DL hopping channel of the DL frequency hopping pattern, and receive DL data on the first DL hopping channel of the DL frequency hopping pattern. If the UE detects a presence of buffered UL data, the UE may switch to a first UL hopping channel of the UL frequency hopping pattern, and may transmit the buffered UL data on the first UL hopping channel of the UL frequency hopping pattern.

When the skipping signal identifies the UE, the UE may stay on an anchor channel for a time period. In some implementations, the one or more UEs identified by the skipping signal may skip frequency hopping between the anchor channel and the DL hopping channels during the time period. If a respective one of the identified UEs detects a presence of buffered UL data during the time period, the respective UE may switch to a first UL hopping channel of the UL frequency hopping pattern, and transmit the buffered UL data on the first UL hopping channel of the UL frequency hopping pattern.

Particular implementations of the subject matter described in this disclosure can be implemented to realize one or more of the following potential advantages. The ability of base stations and UEs to communicate with each other using narrowband communications in an unlicensed frequency band may improve channel access because there may be less contention on relatively small frequency bands (such as the hopping channels associated with the DL and UL frequency hopping patterns) than on relatively large frequency bands (such as primary channels used in wideband communications). Unlicensed frequency bands may be more ubiquitous than licensed portions of the radio frequency (RF) spectrum, and therefore narrowband communications performed in one or more unlicensed frequency bands may provide better coverage for wireless communication devices (such as base stations and UEs) than communications performed solely on licensed portions of the RF spectrum. Further, employing frequency hopping techniques in narrowband communications on one or more unlicensed frequency bands may reduce interference from other wireless communication devices operating on unlicensed frequency bands by exploiting the frequency diversity of the unlicensed frequency bands.

Also, by identifying one or more UEs (or one or more groups of UEs) for which the base station does not have queued DL data during a respective time period and allowing the identified UEs (or groups of UEs) to stay on the anchor channel during the respective time period, implementations of the subject matter disclosed herein may reduce power consumption of the one or more identified UEs (or groups of UEs) associated with switching between the anchor channel and one or more DL channels of the DL frequency hopping pattern. Moreover, by allowing UEs identified by the skipping signal to jump to an UL hopping channel and transmit buffered UL data during the time period, implementations of the subject matter disclosed herein may reduce power consumption of the identified UEs without adversely impacting UL throughput.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100 includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNIT bands). When operating in unlicensed radio bands, wireless communication devices (such as the base stations 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

Figure 2:
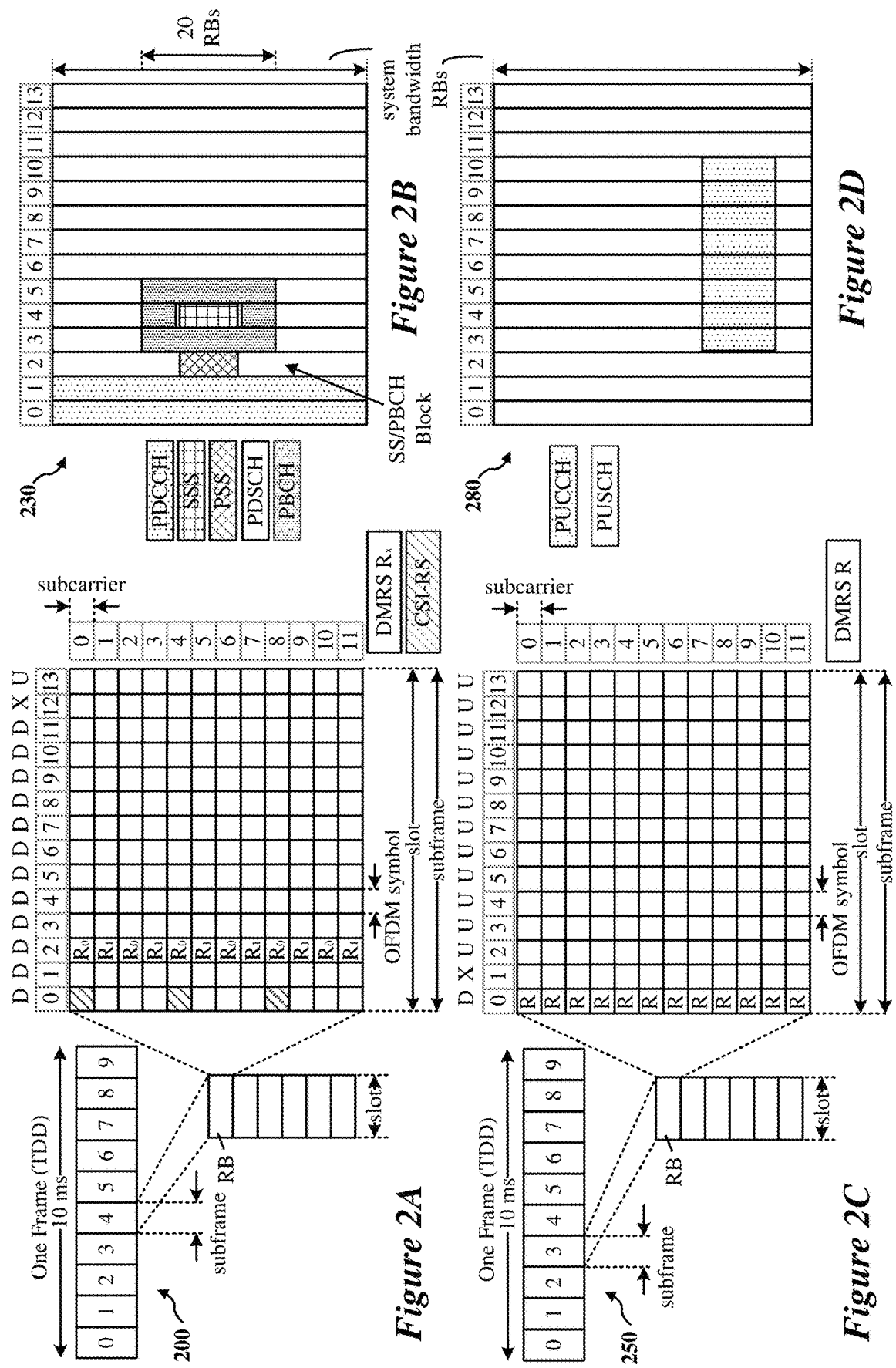
FIG. 2A shows an example of a first 5G/NR frame.
FIG. 2B shows example downlink (DL) channels within a 5G/NR slot.
FIG. 2C shows an example of a second 5G/NR frame.
FIG. 2D shows example uplink (UL) channels within a 5G/NR slot.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (μs) may be divided into 10 equally sized subframes each having a duration of 1 μs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and $2^\mu$ slots per subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH)

carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
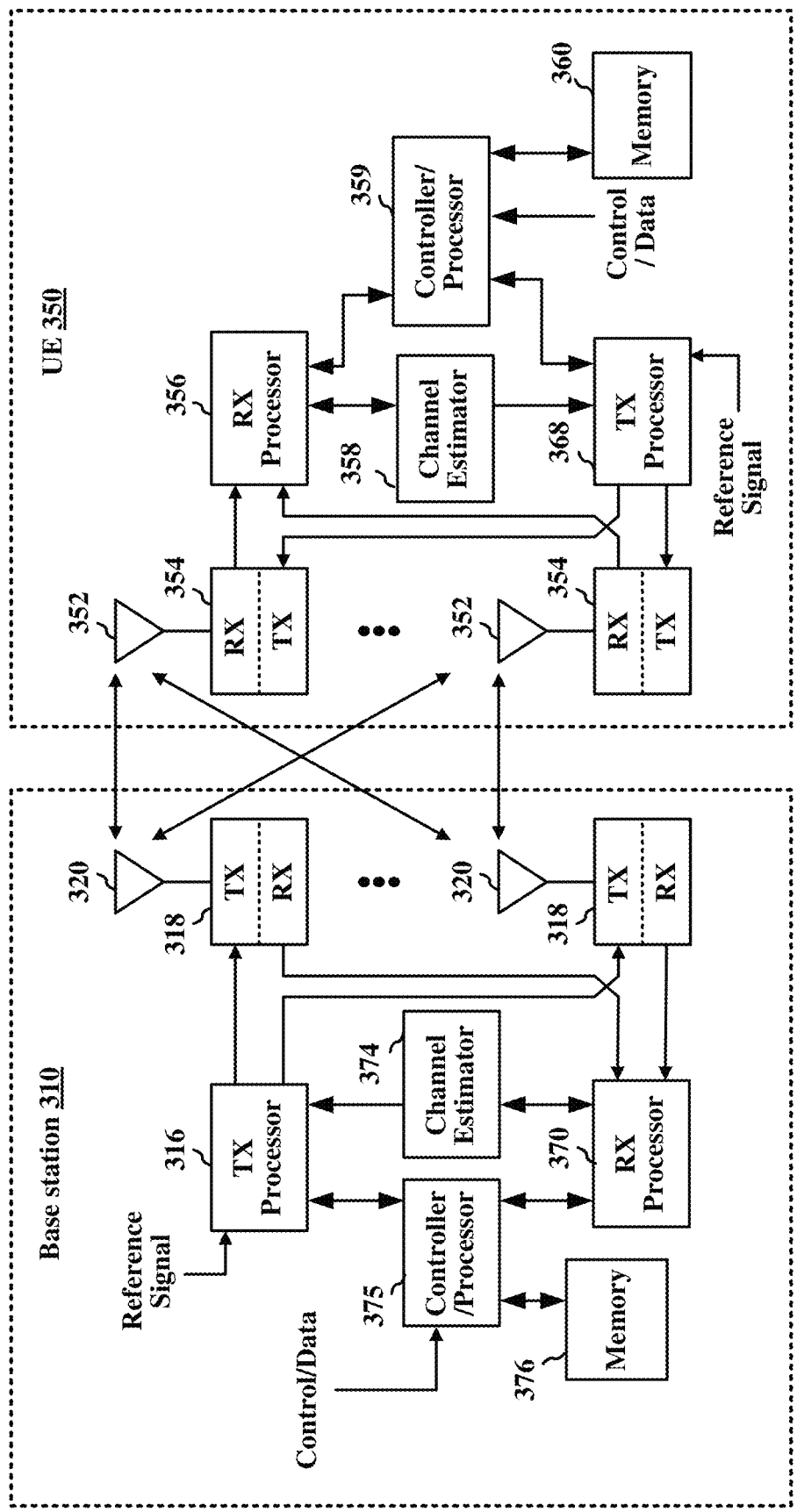
FIG. 3 shows a diagram illustrating an example base station (BS) and user equipment (UE) in an access network.

FIG. 3 shows a block diagram of an example base station 310 and UE 350 in an access network. In the DL, IP packets from the EPC 160 may be provided to a controller/processor 375 of the base station 310. The controller/processor 375 may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 also may provide RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting. The controller/processor 375 also may provide PDCP layer functionality associated with header compression/decompression, security (such as ciphering, deciphering, integrity protection, integrity verification), and handover support functions. The controller/processor 375 also may provide RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also may provide MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some implementations, controller/processor 375 may be a component of a processing system. A processing system may generally refer to a system or series of machines or components that receives inputs and processes the inputs to produce a set of outputs (which may be passed to other systems or components of, for example, the base station 310). For example, a processing system of the base station 310 may refer to a system including the various other components or subcomponents of the base station 310.

The processing system of the base station 310 may interface with other components of the base station 310, and may process information received from other components (such as inputs or signals), output information to other components, and the like. For example, a chip or modem of the base station 310 may include a processing system, a first interface to receive or obtain information, and a second interface to output, transmit or provide information. In some instances, the first interface may refer to an interface between the processing system of the chip or modem and a receiver, such that the base station 310 may receive information or signal inputs, and the information may be passed to the processing system. In some instances, the second interface may refer to an interface between the processing system of the chip or modem and a transmitter, such that the base station 310 may transmit information output from the chip or modem. A person having ordinary skill in the art will readily recognize that the second interface also may obtain or receive information or signal inputs, and the first interface also may output, transmit or provide information.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot signal) in the time or frequency domain, and combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 of the UE 350 provides RRC layer functionality associated with system information (such as the MIB and SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

In some implementations, the controller/processor 359 may be a component of a processing system. A processing system may generally refer to a system or series of machines or components that receives inputs and processes the inputs to produce a set of outputs (which may be passed to other systems or components of the UE 350). For example, a processing system of the UE 350 may refer to a system including the various other components or subcomponents of the UE 350.

The processing system of the UE 350 may interface with other components of the UE 350, and may process information received from other components (such as inputs or signals), output information to other components, and the like. For example, a chip or modem of the UE 350 may include a processing system, a first interface to receive or obtain information, and a second interface to output or transmit information. In some instances, the first interface may refer to an interface between the processing system of the chip or modem and a receiver, such that the UE 350 may receive information or signal inputs, and the information may be passed to the processing system. In some instances, the second interface may refer to an interface between the processing system of the chip or modem and a transmitter, such that the UE 350 may transmit information output from the chip or modem. A person having ordinary skill in the art will readily recognize that the second interface also may obtain or receive information or signal inputs, and the first interface also may output, transmit or provide information.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. In some other implementations, some UEs may have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Narrowband communications involve communicating with a limited frequency bandwidth (such as compared to wideband communications typically used by cellular and Wi-Fi devices), and may be implemented in an unlicensed frequency band. An unlicensed frequency band may refer to a radio-frequency (RF) band that is open for shared use by any device that complies with regulatory agency rules for communicating via the RF band. In some implementations, the unlicensed frequency band may include one or more radio frequencies in the 5 GHz band (such as the UNIT frequency bands between approximately 5.15 GHz and approximately 5.825 GHz). In some other implementations, the unlicensed frequency band may include one or more radio frequencies in the 2.4 GHz band (such as radio frequencies between approximately 2.4 GHz and 2.48 GHz typically used by Wi-Fi devices and wireless networks). In some other implementations, the unlicensed frequency band may include one or more radio frequencies in the 6 GHz band.

In contrast to most licensed RF bands, users of unlicensed frequency bands typically do not have regulatory protection against radio interference from devices of other users, and may be subject to radio interference caused by other devices that use the unlicensed frequency band. Because unlicensed frequency bands may be shared by devices operating according to different communication protocols (such as the 3GPP standards for LTE and 5G NR devices and the IEEE 802.11 standards for Wi-Fi devices), a device operating in an unlicensed frequency band typically contends with other nearby devices for medium access before transmitting data on the unlicensed frequency band.

When communicating in an unlicensed frequency band, a UE or base station may need to coexist or share the unlicensed frequency band with other devices. One way to promote coexistence with other devices is to use a listen-before-talk or listen-before-transmit (LBT) procedure to determine that the shared wireless medium has been idle for a duration before attempting transmissions on the shared wireless medium. In some implementations, LBT procedures may be used with frequency hopping techniques to increase the likelihood of finding a clear channel for communication.

Figure 4:
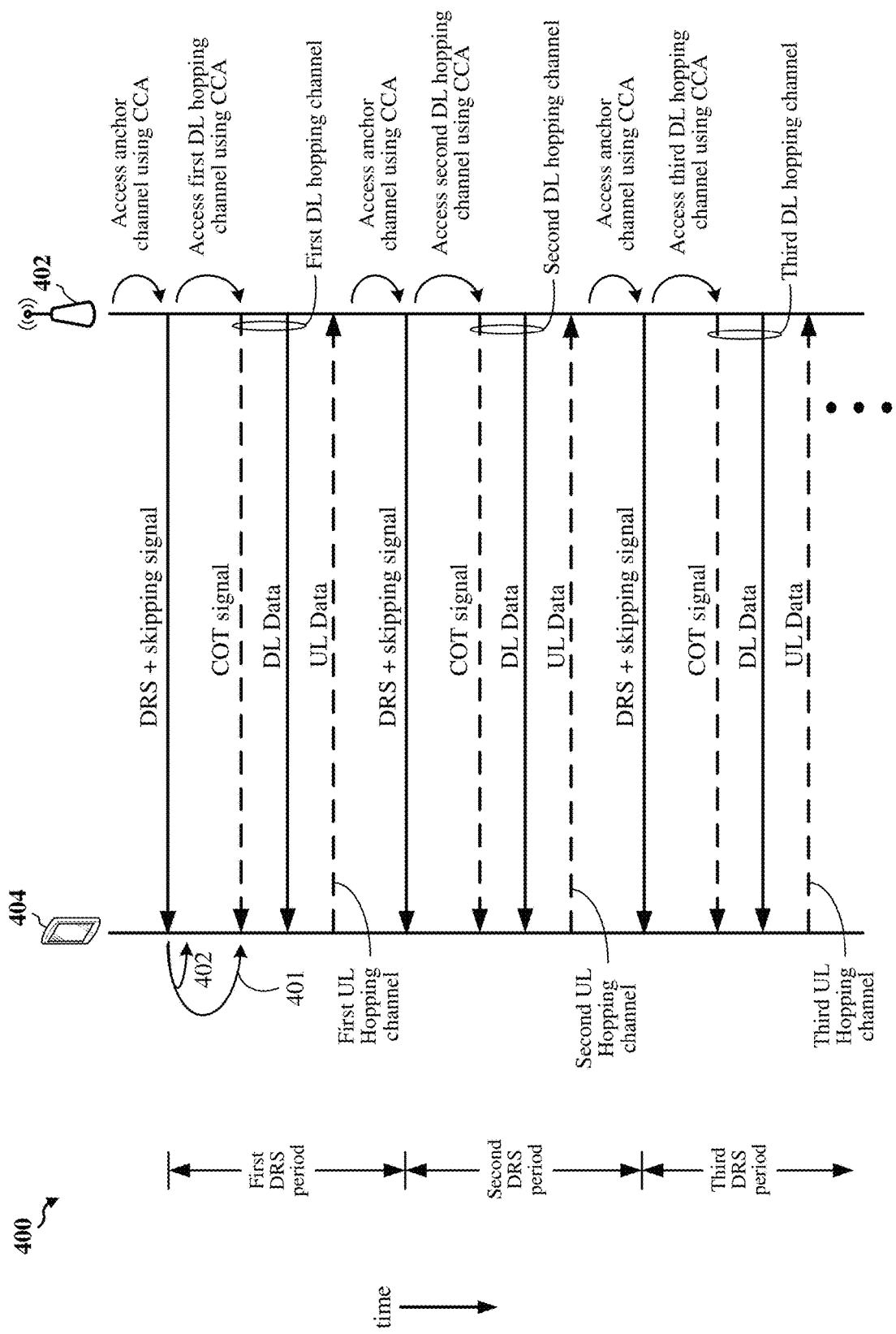
FIG. 4 shows an example sequence diagram for wireless communication that supports frequency hopping between a base station and a UE.

FIG. 4 shows a sequence diagram depicting communications 400 between a base station (BS) 402 and a UE 404 in a radio access network (RAN). The BS 402 may be one example of the BS 102 of FIG. 1 or the BS 310 of FIG. 3, the UE 404 may be one example of the UE 104 of FIG. 1 or the UE 350 of FIG. 3, and the radio access network may be any suitable RAN including, for example, a 5G NR access network. In some implementations, the communications 400 may be narrowband communications in an unlicensed frequency band. Although described herein with reference to unlicensed portions of the 2.4 GHz frequency band, the communications 400 may be performed on one or more other unlicensed frequency bands (such as one or more of the UNII bands in the 5 GHz frequency band, unlicensed portions of the 6 GHz frequency band, or other unlicensed frequency bands).

The BS 402 and UE 404 may use frequency hopping to exploit the frequency diversity in the unlicensed frequency band. The BS 402 may transmit DL data to the UE 404 according to a DL frequency hopping pattern that includes a sequence of DL hopping channels, and the UE 404 may transmit UL data to the BS 402 according to an UL frequency hopping pattern that includes a sequence of UL hopping channels different than the sequence of DL hopping channels. In some implementations, each DL hopping channel of the sequence of DL hopping channels may be associated with a corresponding DL hopping frame of a sequence of DL hopping frames, and each UL hopping channel of the sequence of UL hopping channels may be associated with a corresponding UL hopping frame of a sequence of UL hopping frames. The DL hopping frames may be used to transmit DL data on corresponding DL hopping channels of the DL frequency hopping pattern, and the UL hopping frames may be used to transmit UL data on corresponding UL hopping channels of the UL frequency hopping pattern. In some implementations, the DL hopping channels may be separated from corresponding UL hopping channels by a frequency gap configured or selected to reduce interference between DL and UL transmissions associated with the communications 400.

The BS 402 may transmit a discovery reference signal (DRS) to the UE 404 on an anchor channel of a shared wireless medium. The DRS may indicate at least one of the DL frequency hopping pattern or the UL frequency hopping pattern. In some implementations, the DRS may indicate locations of the DL hopping channels and the UL hopping channels, an order in which the UE 404 is to hop between the DL and UL hopping channels, the dwell time on each hopping channel, a duration of the DL and UL hopping channels, the gap frequency, or any combination thereof. In some other implementations, the DRS may indicate locations of the DL hopping channels, and the UE 404 may derive the UL frequency hopping pattern based on the DL frequency hopping pattern and an identifier unique to the UE 404 (such as a UEID).

The DRS also may include one or more of a primary synchronization signal (PSS), a secondary synchronization signal (SSS), a physical broadcast channel (PBCH), a system information block (SIB), or a slot format indicator (SFI). In some implementations, the DRS also may include a remaining minimum system information (RMSI) field containing information indicative of the DL frequency hopping pattern.

The DRS also may include a skipping signal that indicates a duration for which one or more UEs or groups of UEs are to skip frequency hopping between the anchor channel and the DL hopping channels of the DL frequency hopping pattern. In some implementations, the skipping signal may indicate (or may be based on) an absence of queued DL data for the one or more identified UEs or groups of UEs.

The skipping duration may be indicated or expressed using any suitable technique. In some implementations, the skipping signal may indicate the skipping duration as a number (N) of DL hopping channels, where N is an integer greater than or equal to 1. For example, if the skipping signal indicates that the UE 404 is to skip N=2 DL hopping channels, the UE 404 may stay on the anchor channel for a duration corresponding to the dwell times on the first and second DL hopping channels (or at least avoid frequency hopping between the anchor channel and the first and second DL hopping channels). In some other implementations, the skipping signal may indicate the skipping duration as a number (M) of DRS periods, where M may be an integer or a non-integer greater than 0. For one example, if the skipping signal indicates that the UE 404 is to skip frequency hopping between the anchor channel and the DL hopping channels for M=1 DRS period, the UE 404 may stay on the anchor channel for a duration corresponding to the first DRS period, and jump to the second DL hopping channel during the second DRS period. For another example, if the skipping signal indicates that the UE 404 is to skip frequency hopping between the anchor channel and the DL hopping channels for M=1/2 DRS period, the UE 404 may stay on the anchor channel for a duration corresponding to one-half of the first DRS period, and jump to the first DL hopping channel at a mid-point of the dwell time on the first DL hopping channel.

In some implementations, the skipping signal may be encoded in a bitmap contained in a reduced RMSI field of the DRS. The bitmap may identify the one or more UEs that are to skip frequency hopping between the anchor channel and the DL hopping channels, or may identify one or more groups of UEs that are to skip frequency hopping between the anchor channel and the DL hopping channels. In some other implementations, the skipping signal may be contained in the frequency domain resource assignment (FDRA) field (or any other suitable field) of a downlink control information (DCI) message. In some other implementations, the skipping signal may be included in a slot format indicator (SFI) carried by the DRS. For example, the skipping signal may be contained in a reserved slotFormat ID of the SFI, or may be indicated by an SFI format index.

After transmission of the DRS, the BS 402 may jump to the first DL hopping channel. The UE 404 may receive the DRS, and use information contained therein to determine the locations of the DL hopping channels, to determine the locations of the UL hopping channels, and to determine whether the skipping signal identifies the UE 404. The UE 404 may either jump to the first DL hopping channel or stay on the anchor channel based on information contained in the skipping signal.

When the UE 404 is not identified by the skipping signal, the UE 404 may jump to the first DL hopping channel and monitor the first DL hopping channel for DL data, one or more reference signals, configured grants, and other information transmitted by the BS 402, as indicated by arrow 401 in FIG. 4. In some implementations, the BS 402 may contend for medium access to the first DL hopping channel using a CCA-based medium access contention operation, and may obtain access to the first DL hopping channel for a channel occupancy time (COT) based on winning the contention operation. The BS 402 may transmit a signal informing the UE 404 of the obtained COT on the first DL hopping channel. The signal may be one or more of system information channel occupancy time (SI-COT), a group-common physical downlink control channel (GC-PDCCH), or a common transmit preamble.

If the UE 404 detects the signal, the UE 404 may begin receiving DL data from the BS 402 on the first DL hopping channel. In some implementations, the UE 404 may be configured for full-duplex operation, and may receive DL data on the first DL hopping channel concurrently with transmitting UL data on the first UL hopping channel. In some other implementations, the UE 404 may be configured for half-duplex operation, and may transmit UL data on the first UL hopping channel during portions of the first DRS period when the UE 404 is not receiving DL data. If the UE 404 does not detect the signal within a time period after transmission of the DRS, the UE 404 may jump to the next DL hopping channel, or may transmit UL data to the BS 402 using configured grant (CG) resources.

At the end of the first DRS period, the BS 402 and the UE 404 may return to the anchor channel. The BS 402 may transmit another DRS on the anchor channel to indicate the beginning of the second DRS period, and operations between the BS 402 and UE 404 may continue in a similar manner for a remainder of the DL frequency hopping pattern.

When the UE 404 is identified by the skipping signal, the UE 404 may stay on the anchor channel for a time period indicated by the skipping signal, rather than jumping to the first DL hopping channel, as indicated by arrow 402 in FIG. 4. In some implementations, the BS 402 may generate the skipping signal based on an absence of queued DL data for one or more UEs or groups of UEs (such as the UE 404). For one example, the BS 402 may determine an absence of queued DL data for one or more UEs for a time period, and may configure the skipping signal to identify the one or more UEs and to indicate that the one or more identified UEs are to skip frequency hopping between the anchor channel and the DL hopping channels for the time period. For another example, the BS 402 may determine an absence of queued DL data for one or more groups of UEs for a time period, and may configure the skipping signal to identify the one or more groups of UEs and to indicate that the one or more identified groups of UEs are to skip frequency hopping between the anchor channel and the DL hopping channels for the time period. In this manner, power consumption associated with frequency hopping may be reduced in UEs identified by the skipping signal.

In some implementations, the UE 404 may jump to one or more UL hopping channels during the indicated time period if the UE 404 has buffered UL data to transmit, and return to the anchor channel. If the UE 404 does not have buffered UL data, the UE 404 may stay on the anchor channel for the remainder of the indicated time period. In some implementations, when the UE 404 has buffered UL data to transmit using either a configured grant or a physical random access channel (PRACH), the UE 404 may jump to the first UL hopping channel, transmit the buffered UL data on the first UL hopping channel, jump to the first DL hopping channel to receive a re-transmission grant or a random access response (RAR), and return to the anchor channel. In some other implementations, when the UE 404 is to transmit reference signals (such as a SRS) or control signals on the PUUCH, rather than UL data, the UE 404 may jump to the first UL hopping channel, transmit the reference signals or control signals on the first UL hopping channel, and return to the anchor channel.

Figure 5:
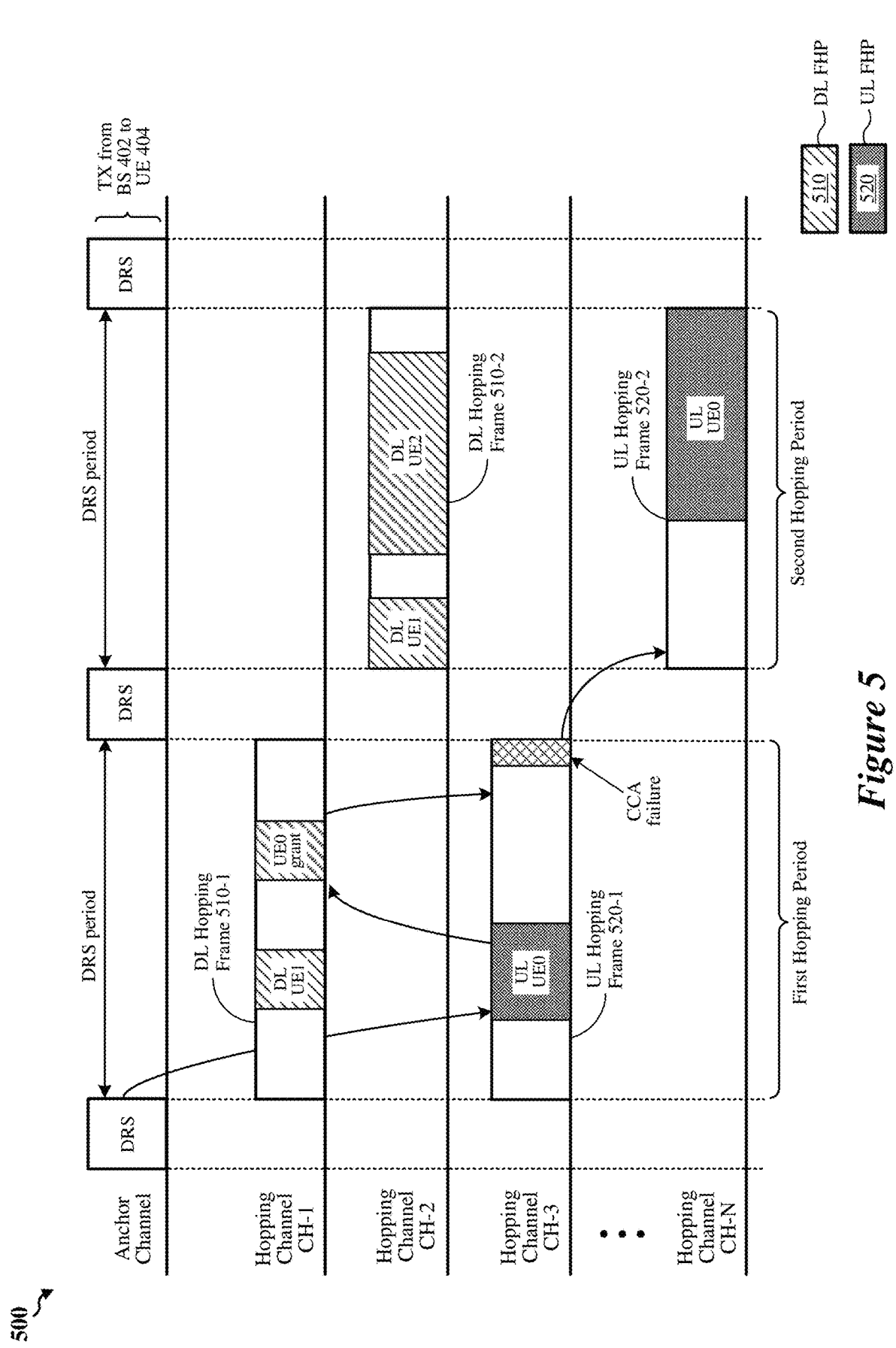
FIG. 5 shows an example frequency hopping pattern that may be used for narrowband communications between a base station and a UE.

FIG. 5 shows an example frequency hopping pattern 500 that may be used for narrowband communications between the BS 402 and the UE 404. The frequency hopping pattern 500 includes a DL frequency hopping pattern 510 and an UL frequency hopping pattern 520. The DL frequency hopping pattern 510 and the UL frequency hopping pattern 520 each may include any suitable number (N) of unique hopping channels. In some implementations, the DL frequency hopping pattern 510 and the UL frequency hopping pattern 520 each may include N=15 different hopping channels. In some other implementations, the DL frequency hopping pattern 510 and the UL frequency hopping pattern 520 each may include more than 15 different hopping channels. In aspects for which the BS 402 and the UE 404 exchange data using narrowband communications in the 2.4 GHz frequency spectrum, the anchor channel may have a bandwidth of less than 5 MHz, and each of the DL hopping channels and UL hopping channels may have a bandwidth not greater than 5 MHz.

The DL frequency hopping pattern 510 includes a sequence of DL hopping channels upon which a sequence of DL hopping frames 510-1 to 510-N (only two DL hopping frames 510-1 and 510-2 shown for simplicity) may be used to transmit DL data to one or more UEs. The UL frequency hopping pattern 520 includes a sequence of UL hopping channels upon which a sequence of UL hopping frames 520-1 to 520-N (only two UL hopping frames 520-1 and 520-2 shown for simplicity) may be used to transmit UL data to the BS 402. Each of the DL hopping channels of the DL frequency hopping pattern 510 may be separated from a corresponding UL hopping channel of the UL frequency hopping pattern 520 by at least a gap frequency that is configured or selected to minimize interference between DL and UL transmissions. In some implementations, the DL hopping frames of the DL frequency hopping pattern 510 may be separated from corresponding UL hopping frames of the UL frequency hopping pattern 520 by a constant frequency offset in modulo.

The BS 402 and the UE 404 initially tune to the anchor channel, and the BS 402 transmits the DRS to indicate a beginning of the first DRS period. The DRS may indicate at least one of the DL frequency hopping pattern 510 or the UL frequency hopping pattern 520, and may include a skipping signal that indicates a time period during which one or more UEs (or groups of UEs) are to skip frequency hopping between the anchor channel and DL hopping channels of the DL frequency hopping pattern 510. In some implementations, the indicated time period may be one of a number of the DL hopping channels, a number of DRS periods, or a portion of a DRS period.

The UE 404 may receive the DRS, identify the DL hopping channels of the DL frequency hopping pattern 510 and the UL hopping channels of the UL frequency hopping pattern 520, and determine whether the skipping signal identifies the UE 404. The skipping signal in the example of FIG. 5 identifies the UE 404 and indicates a time period of N=2 DL hopping channels, thereby allowing the UE 404 to stay on the anchor channel, or to at least skip frequency hopping between the anchor channel and the DL hopping channels, for 2 DRS periods.

After transmitting the first DRS, the BS 402 jumps to the first DL hopping channel CH-1 and transmits DL data to UE1 using a first portion of the first DL hopping frame 510-1. The UE 404 has buffered UL data, jumps to the first UL hopping channel CH-3, and transmits UL data on a configured grant using a portion of the first UL hopping frame 520-1. The UE 404 jumps to the first DL hopping channel CH-1, and receives a re-transmission grant from the BS 402 using a second portion of the first DL hopping frame 510-1.

The UE 404 returns to the first UL hopping channel CH-3 to transmit additional UL data using a second portion of the first UL hopping frame 520-1, and fails to obtain access to the first UL hopping channel 520-1 using a CCA-based medium access contention operation. In response thereto, the UE 404 may jump to the second UL hopping frame 520-2, and transmit the additional UL data using a portion of the second UL hopping frame 520-2.

Figure 6:
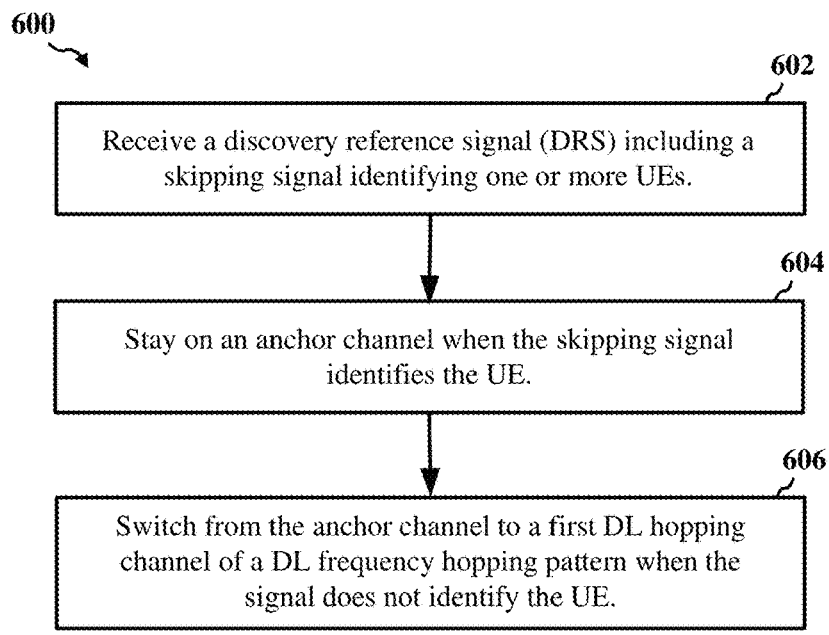
FIG. 6 shows a flowchart depicting an example operation for wireless communication that supports frequency hopping between a base station and a UE.

FIG. 6 shows a flowchart depicting an example operation 600 for wireless communication that supports frequency hopping between a BS and a UE. The operation 600 may be performed by an apparatus of a wireless communication device such as the UE 104 of FIG. 1, the UE 350 of FIG. 3, or the UE 404 of FIG. 4. At block 602, the UE receives a discovery reference signal (DRS) including a skipping signal identifying one or more UEs. At block 604, the UE stays on an anchor channel when the skipping signal identifies the UE. At block 606, the UE switches from the anchor channel to a first DL hopping channel of a DL frequency hopping pattern when the signal does not identify the UE. In some implementations, the one or more UEs identified by the skipping signal may be permitted to enter a low-power state for one or more DRS periods (or other periods of time indicated by the DRS). In some other implementations, the skipping signal may indicate an absence of queued DL data during one or more DRS periods for each of the one or more identified UEs.

In some implementations, the DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In some other instances, the DRS may indicate the DL frequency hopping pattern.

In some implementations, the skipping signal may be received in a reduced remaining minimum system information (RMSI) field of the DRS. In some instances, the RMSI field may include a bitmap identifying one or more UEs that are to stay on the anchor channel for at least a time period. For example, each bit of the bitmap may be used to indicate that a corresponding UE of the one or more identified UEs is to remain on the anchor channel for the time period. In some other instances, the RMSI field may include a bitmap identifying one or more groups of UEs that are to remain on the anchor channel for the time period. In some implementations, the one or more identified groups of UEs may be mapped to corresponding bits of the bitmap via a radio resource control (RRC) configuration.

In some other implementations, the skipping signal may be included in a frequency domain resource assignment (FDRA) field of a downlink control information (DCI) message. In some other instances, the skipping signal may be indicated by a slot format indicator (SFI) format index carried by the DRS.

Figure 7:
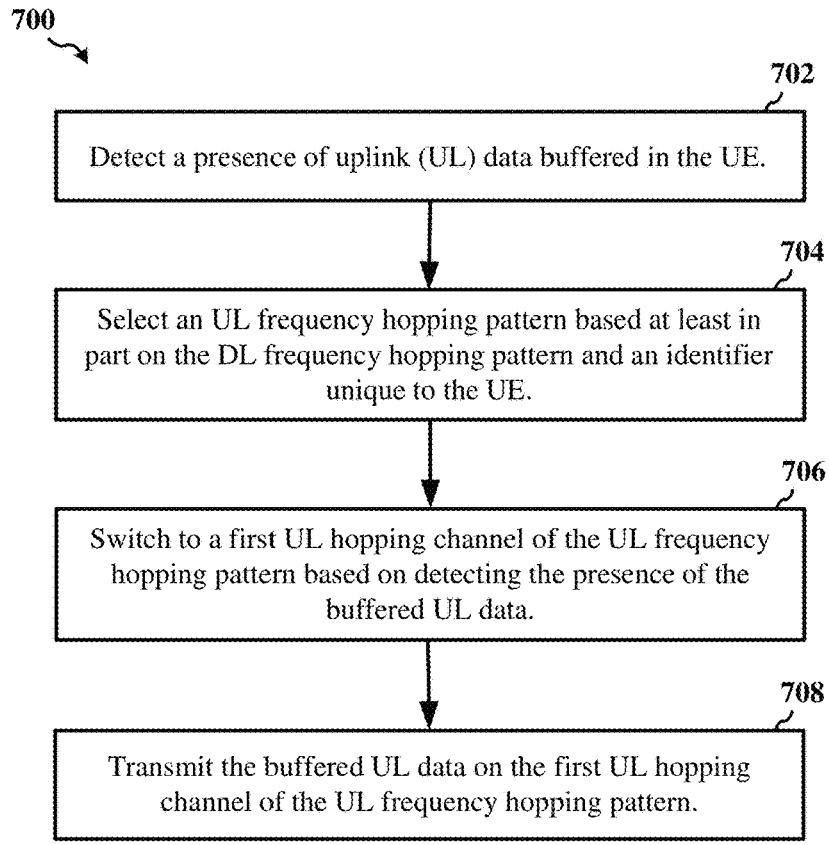
FIG. 7 shows a flowchart depicting an example operation for wireless communication that supports frequency hopping between a base station and a UE.

FIG. 7 shows a flowchart depicting an example operation 700 for wireless communication that supports frequency hopping between a BS and a UE. The operation 700 may be performed by an apparatus of a wireless communication device such as the UE 104 of FIG. 1, the UE 350 of FIG. 3, or the UE 404 of FIG. 4. In some implementations, the operation 700 may be performed after selectively switching to the first DL hopping channel in block 606 of FIG. 6. For example, at block 702, the UE detects a presence of uplink (UL) data buffered in the UE. At block 704, the UE selects an UL frequency hopping pattern based at least in part on the DL frequency hopping pattern and an identifier unique to the UE. At block 706, the UE switches to a first UL hopping channel of the UL frequency hopping pattern based on detecting the presence of the buffered UL data. At block 708, the UE transmits the buffered UL data on the first UL hopping channel of the UL frequency hopping pattern. In some implementations, the first UL hopping channel of the UL frequency hopping pattern corresponds to one of a configured grant (CG) configuration or a physical random access channel (PRACH).

Figure 8:
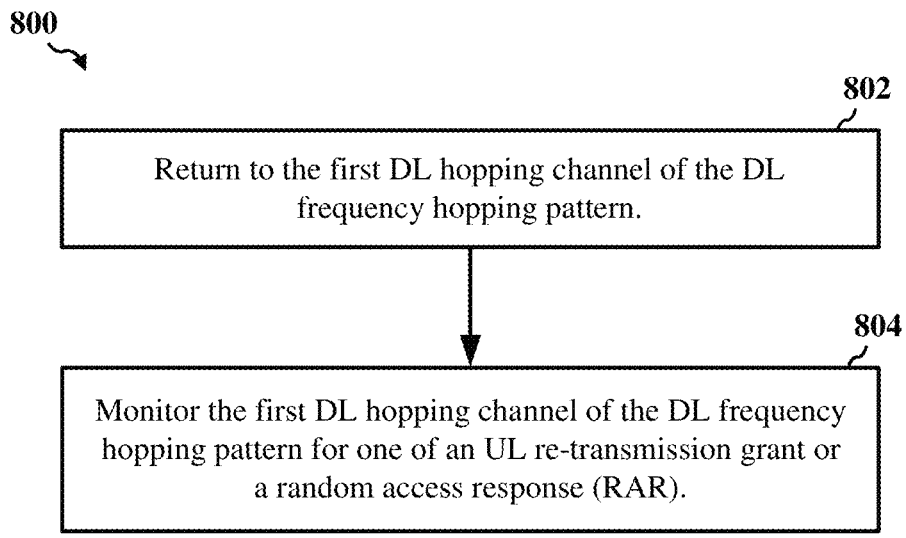
FIG. 8 shows a flowchart depicting an example operation for wireless communication that supports frequency hopping between a base station and a UE.

FIG. 8 shows a flowchart depicting an example operation 800 for wireless communication that supports frequency hopping between a BS and a UE. The operation 800 may be performed by an apparatus of a wireless communication device such as the UE 104 of FIG. 1, the UE 350 of FIG. 3, or the UE 404 of FIG. 4. In some implementations, the operation 800 may be performed after transmitting the buffered UL data on the first UL hopping channel in block 708 of FIG. 7. For example, at block 802, the UE returns to the first DL hopping channel of the DL frequency hopping pattern. At block 804, the UE monitors the first DL hopping channel of the DL frequency hopping pattern for one of an UL re-transmission grant or a random access response (RAR). In some implementations, the UE may return to the first DL hopping channel after transmitting buffered UL data on the first UL hopping channel and receive a re-transmission grant that allows the UE to transmit additional buffered UL data. In some other implementations, the UE may return to the first DL hopping channel after transmitting buffered UL data on the first UL hopping channel and receive a message (such as an RAR) indicating which portions of the transmitted UL data were received and correctly decoded by the BS.

Figure 9:
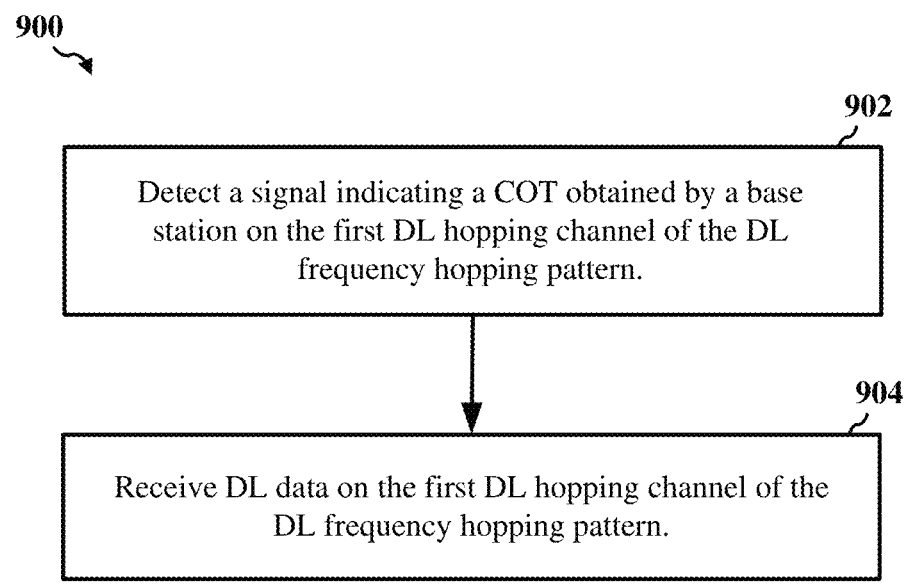
FIG. 9 shows a flowchart depicting an example operation for wireless communication that supports frequency hopping between a base station and a UE.

FIG. 9 shows a flowchart depicting an example operation 900 for wireless communication that supports frequency hopping between a BS and a UE. The operation 900 may be performed by an apparatus of a wireless communication device such as the UE 104 of FIG. 1, the UE 350 of FIG. 3, or the UE 404 of FIG. 4. In some implementations, operation 900 may be one example of selectively switching to the first DL hopping channel in block 606 of FIG. 6. For example, at block 902, the UE detects a signal indicating a channel occupancy time (COT) obtained by a BS on the first DL hopping channel of the DL frequency hopping pattern. At block 904, the UE receives DL data on the first DL hopping channel of the DL frequency hopping pattern.

As discussed, in some instances, the BS may contend for channel access to the first DL hopping channel using a CCA-based channel access contention operation. After obtaining a COT on the first DL hopping channel, the BS may transmit a signal informing one or more UEs 104 of the COT obtained on a respective DL hopping channel. In some instances, signal may be one or more of system information channel occupancy time (SI-COT), a group-common physical downlink control channel (GC-PDCCH), or a common transmit preamble.

Figure 10:
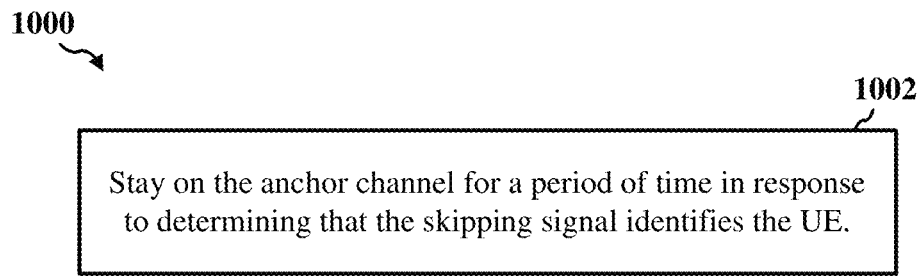
FIG. 10 shows a flowchart depicting an example operation for wireless communication that supports frequency hopping between a base station and a UE.

FIG. 10 shows a flowchart depicting an example operation 1000 for wireless communication that supports frequency hopping between a BS and a UE. The operation 1000 may be performed by an apparatus of a wireless communication device such as the UE 104 of FIG. 1, the UE 350 of FIG. 3, or the UE 404 of FIG. 4. In some implementations, the operation 1000 may be one example of selectively switching to the first DL hopping channel in block 606 of FIG. 6. For example, at block 1002, the UE stays on the anchor channel for a period of time in response to determining that the skipping signal identifies the UE. In some implementations, UEs identified by the skipping signal may not have any queued DL data in the BS 402, and therefore can saver power by remaining on the anchor channel rather than jumping to a DL hopping channel (such as when the BS does not have any DL data to transmit to the UE). In some instances, the UE may return to a low-power state or sleep state in response to determining that the skipping signal identifies the UE.

Figure 11:
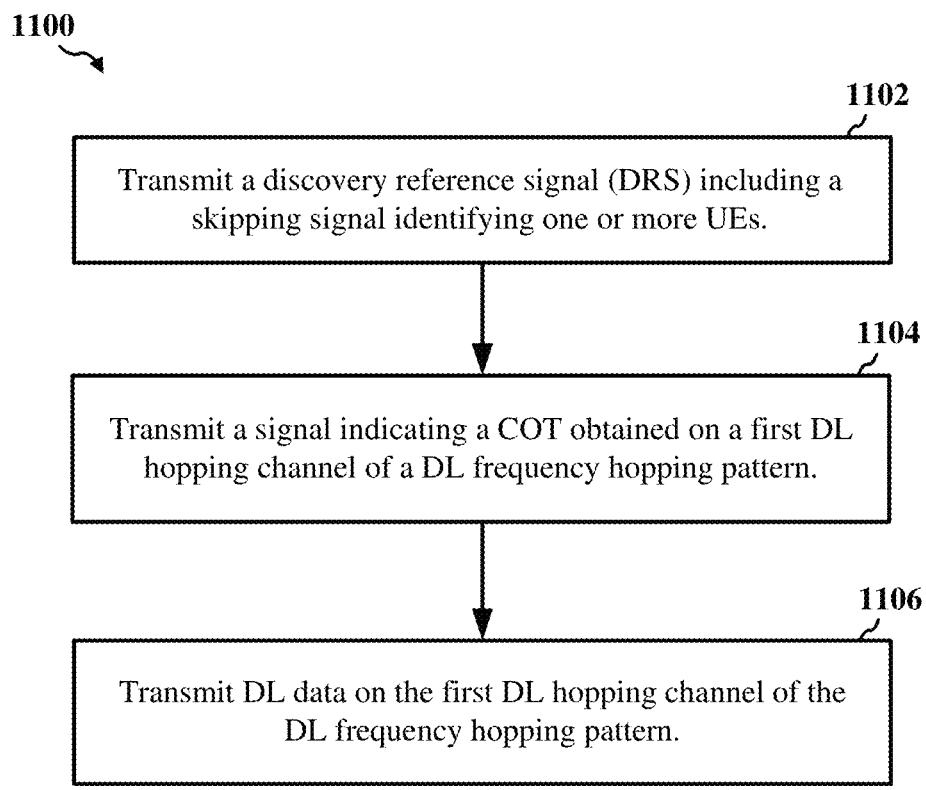
FIG. 11 shows a flowchart depicting an example operation for wireless communication that supports frequency hopping between a base station and a UE.

FIG. 11 shows a flowchart depicting an example operation 1100 for wireless communication that supports frequency hopping between a BS and a UE. The operation 1100 may be performed by an apparatus of a wireless communication device such as the BS 102 of FIG. 1, the BS 310 of FIG. 3, or the BS 402 of FIG. 4. At block 1102, the BS transmits a discovery reference signal (DRS) including a skipping signal identifying one or more user equipments (UEs). At block 1104, the BS transmits a signal indicating a channel occupancy time (COT) obtained on a first downlink (DL) hopping channel of a DL frequency hopping pattern. At block 1106, the BS transmits DL data on the first DL hopping channel of the DL frequency hopping pattern. In some implementations, the one or more UEs identified by the skipping signal may be permitted to enter a low-power state for one or more DRS periods (or other periods of time indicated by the DRS). In some other implementations, the skipping signal may indicate an absence of queued DL data during one or more DRS periods for each of the one or more identified UEs.

In some implementations, the DRS may include one or more of a primary synchronization signal (PSS), a secondary synchronization signal (SSS), a physical broadcast channel (PBCH), or a system information block (SIB). In some instances, the DRS may be received on an anchor channel of an unlicensed frequency band. In some other instances, the DRS may indicate the DL frequency hopping pattern.

In some implementations, the skipping signal may be received in a reduced remaining minimum system information (RMSI) field of the DRS. In some instances, the RMSI field may include a bitmap identifying one or more UEs that are to stay on the anchor channel for at least a time period. For example, each bit of the bitmap may be used to indicate that a corresponding UE of the one or more identified UEs is to remain on the anchor channel for the time period. In some other instances, the RMSI field may include a bitmap identifying one or more groups of UEs that are to remain on the anchor channel for the time period. In some implementations, the one or more identified groups of UEs may be mapped to corresponding bits of the bitmap via a radio resource control (RRC) configuration.

In some other implementations, the skipping signal may be included in a frequency domain resource assignment (FDRA) field of a downlink control information (DCI) message. In some other instances, the skipping signal may be indicated by a slot format indicator (SFI) format index carried by the DRS.

Figure 12:
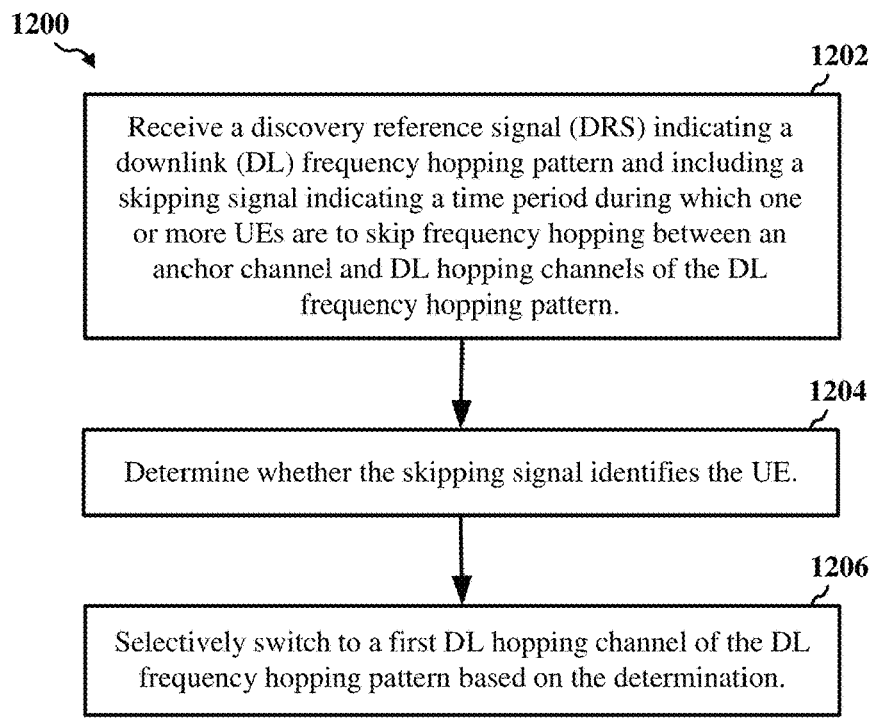
FIG. 12 shows a flowchart depicting an example operation for wireless communication that supports frequency hopping between a base station and a UE.

FIG. 12 shows a flowchart depicting an example operation 1200 for wireless communication that supports frequency hopping between a BS and a UE. The operation 1200 may be performed by an apparatus of a wireless communication device such as the UE 104 of FIG. 1, the UE 350 of FIG. 3, or the UE 404 of FIG. 4. At block 1202, the UE receives a discovery reference signal (DRS) indicating a downlink (DL) frequency hopping pattern and including a skipping signal indicating a time period during which one or more UEs are to skip frequency hopping between an anchor channel and DL hopping channels of the DL frequency hopping pattern. At block 1204, the UE determines whether the skipping signal identifies the UE. At block 1206, the UE selectively switches to a first DL hopping channel of the DL frequency hopping pattern based on the determination.

The DL frequency hopping pattern may include a sequence of DL hopping channels upon which the BS may transmit DL data. Each of the DL hopping channels may be associated with a corresponding DL hopping frame of a sequence of DL hopping frames. In some implementations, the BS may transmit DL data to one or more UEs in each of the DL hopping frames.

In some implementations, the DRS in block 1202 may include one or more of a primary synchronization signal (PSS), a secondary synchronization signal (SSS), a physical broadcast channel (PBCH), a system information block (SIB), a slot format indicator (SFI), or remaining minimum system information (RMSI). The DRS may be transmitted on an anchor channel of a frequency spectrum (such as one or more unlicensed frequency bands). In some implementations, the frequency spectrum may be an unlicensed frequency band in the 2.4 GHz frequency spectrum, and each of the DL hopping channels may have a bandwidth not greater than 5 MHz. In some other implementations, the frequency spectrum may be an unlicensed frequency band in another frequency spectrum (such as the 5 GHz frequency spectrum or the 6 GHz frequency spectrum), and one or both of the DL hopping channels and the UL hopping channels may have other suitable bandwidths.

In some implementations, the skipping signal in block 1202 also may indicate an absence of DL data for the one or more UEs during a time period. The time period indicated by the skipping signal may be one of a number of the DL hopping channels, a number of DRS periods, or a portion of a DRS period.

In some implementations, the skipping signal in block 1202 may be included in a reduced remaining minimum system information (RMSI) field of the DRS. The RMSI field may include a bitmap identifying the one or more UEs that are to skip frequency hopping between the anchor channel and the DL hopping channels. Each bit of the bitmap may be used to indicate that a corresponding UE of the one or more identified UEs is to skip frequency hopping between the anchor channel and the DL hopping channels. In some other implementations, the RMSI field may include a bitmap identifying one or more groups of UEs that are to skip frequency hopping between the anchor channel and the DL hopping channels. Each bit of the bitmap may be used to indicate that a corresponding group of UEs of the one or more identified groups of UEs are to skip frequency hopping between the anchor channel and the DL hopping channels. In some implementations, the one or more identified groups of UEs may be mapped to corresponding bits of the bitmap via a radio resource control (RRC) configuration.

In some other implementations, the skipping signal in block 1202 may be carried in a downlink control information (DCI) message received from the BS. The skipping signal may be contained in a frequency domain resource assignment (FDRA) field of the DCI message, and the DCI message may be configured in a Type3 common search space. In some other implementations, the skipping signal in block 1202 may be included in a slot format indicator (SFI) carried by the DRS. In some aspects, the skipping signal may be contained in a reserved slotFormat ID of the SFI. In other aspects, the skipping signal may be indicated by an SFI format index.

Figure 13:
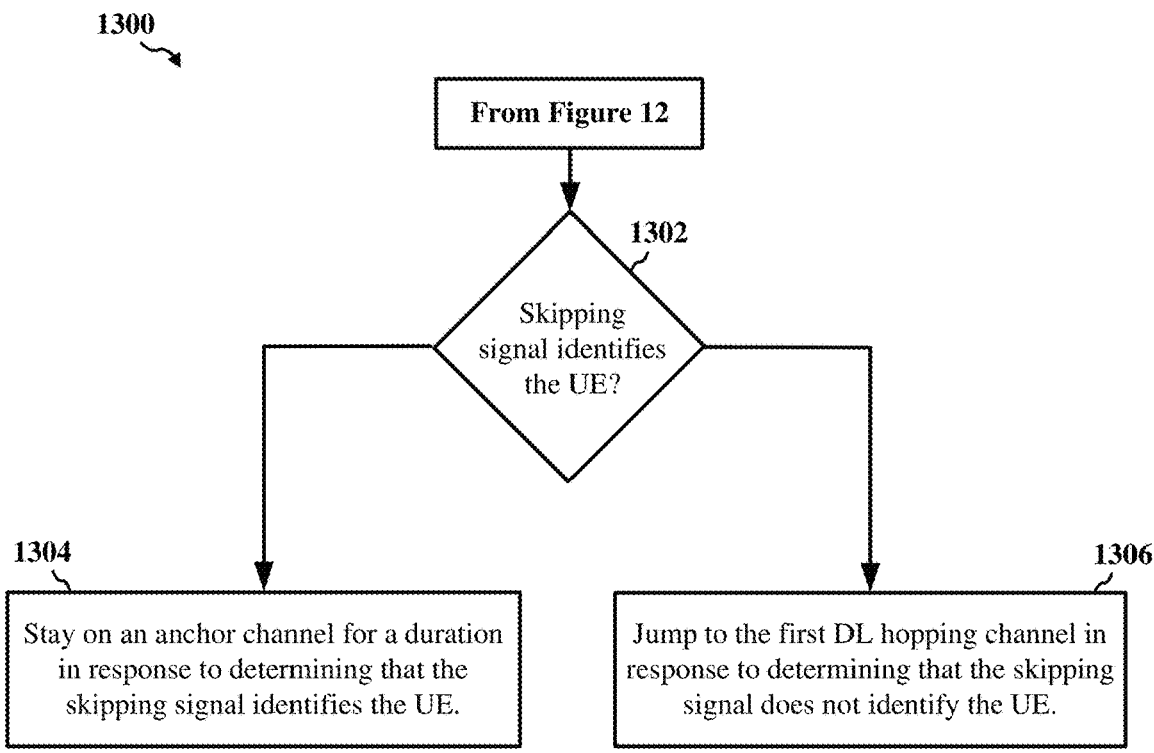
FIG. 13 shows a flowchart depicting an example operation for wireless communication that supports frequency hopping between a base station and a UE.

FIG. 13 shows a flowchart depicting an example operation 1300 for wireless communication that supports frequency hopping between a BS and a UE. The operation 1300 may be performed by an apparatus of a wireless communication device such as the UE 104 of FIG. 1, the UE 350 of FIG. 3, or the UE 404 of FIG. 4. In some implementations, the operation 1300 may be one example of selectively switching to the first DL hopping channel in block 1206 of FIG. 12. For example, in block 1302, the UE determines whether the skipping signal identifies the UE. At block 1304, the UE stays on the anchor channel for a duration in response to determining that the skipping signal identifies the UE. At block 1306, the UE jumps to the first DL hopping channel of the DL frequency hopping pattern in response to determining that the skipping signal does not identify the UE.

Figure 14:
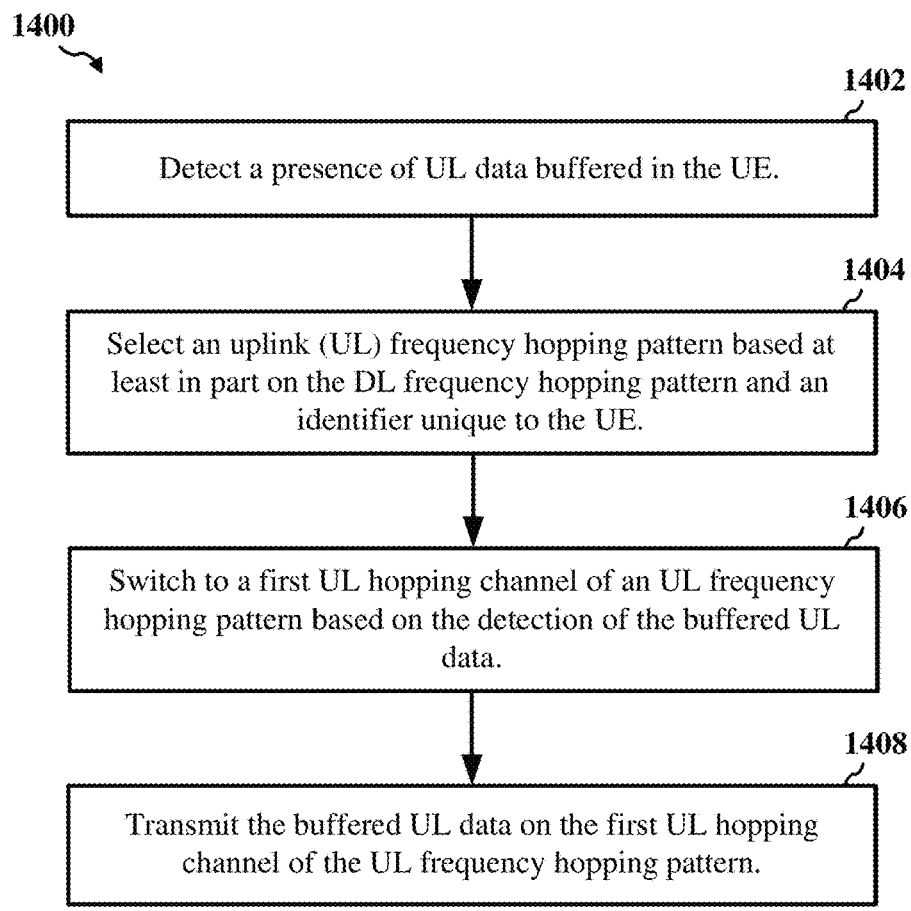
FIG. 14 shows a flowchart depicting an example operation for wireless communication that supports frequency hopping between a base station and a UE.

FIG. 14 shows a flowchart depicting an example operation 1400 for wireless communication that supports frequency hopping between a BS and a UE. The operation 1400 may be performed by an apparatus of a wireless communication device such as the UE 104 of FIG. 1, the UE 350 of FIG. 3, or the UE 404 of FIG. 4. In some implementations, the operation 1400 may begin after staying on the anchor channel in block 1304 of FIG. 13. For example, in block 1402, the UE detects a presence of UL data buffered in the UE. At block 1504, the UE determines an uplink (UL) frequency hopping pattern based at least in part on the DL frequency hopping pattern and an identifier unique to the UE. At block 1506, the UE switches to a first UL hopping channel of the UL frequency hopping pattern based on the detection of the buffered UL data. At block 1508, the UE transmits the buffered UL data on the first UL hopping channel of the UL frequency hopping pattern.

The UL frequency hopping pattern may include one or more unique sequences of UL hopping channels upon which one or more corresponding UEs may concurrently transmit UL data. Each sequence of UL hopping channels may be associated with a unique sequence of UL hopping frames upon which a respective UE may transmit UL data. In some implementations, each sequence of UL hopping channels may be allocated or assigned to a different UE, for example, so that a plurality of UEs may concurrently transmit UL data using their respective sequences of UL hopping channels.

The sequence of DL hopping channels may be different than each of the one or more sequences of UL hopping channels, and the sequence of DL hopping frames may occupy different channels than each of the one or more sequences of UL hopping frames. In some implementations, the DL hopping channels may be separated from each of the UL hopping channels by a gap frequency configured or selected to reduce interference between UL and DL transmissions.

In some implementations, the sequence of DL hopping channels and the one or more sequences of UL hopping channels may be uncoordinated relative to each other, for example, to avoid certain FCC restrictions on communications that employ frequency hopping techniques. In some other implementations, the sequence of DL hopping channels and the one or more sequences of UL hopping channels may be coordinated with each other, for example, to reduce a likelihood that UL hopping channels associated with (or assigned to) different UEs do not overlap in both time and frequency. The one or more sequences of UL hopping channels may be orthogonal to each other, and may be orthogonal to the sequence of DL hopping channels. In some implementations, each of the one or more sequences of UL hopping channels may be based on the sequence of DL hopping channels and an identifier unique to the associated UE (such as a UEID).

Figure 15:
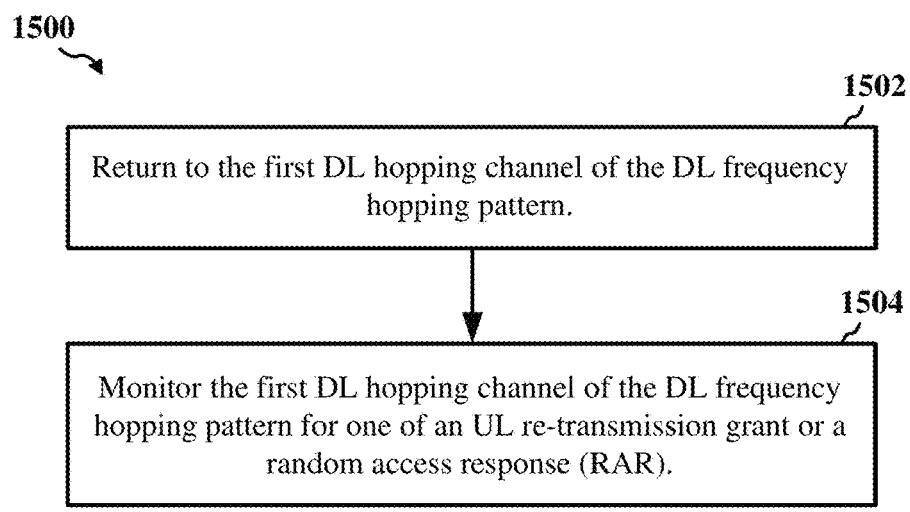
FIG. 15 shows a flowchart depicting an example operation for wireless communication that supports frequency hopping between a base station and a UE.

FIG. 15 shows a flowchart depicting an example operation 1500 for wireless communication that supports frequency hopping between a BS and a UE. The operation 1500 may be performed by an apparatus of a wireless communication device such as the UE 104 of FIG. 1, the UE 350 of FIG. 3, or the UE 404 of FIG. 4. In some implementations, the operation 1500 may begin after transmitting the buffered UL data in block 1408 of FIG. 14. For example, in block 1502, the UE returns to the first DL hopping channel of the DL frequency hopping pattern. At block 1504, the UE monitors the first DL hopping channel of the DL frequency hopping pattern for one of an UL re-transmission grant or a random access response (RAR).

Figure 16:
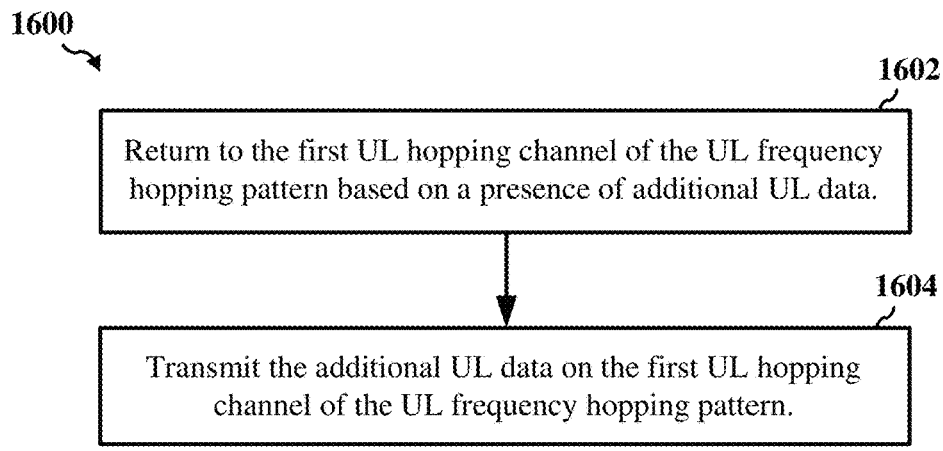
FIG. 16 shows a flowchart depicting an example operation for wireless communication that supports frequency hopping between a base station and a UE.

FIG. 16 shows a flowchart depicting an example operation 1600 for wireless communication that supports frequency hopping between a BS and a UE. The operation 1600 may be performed by an apparatus of a wireless communication device such as the UE 104 of FIG. 1, the UE 350 of FIG. 3, or the UE 404 of FIG. 4. In some implementations, the operation 1600 may begin after monitoring the first DL hopping channel in block 1504 of FIG. 15. For example, in block 1602, the UE returns to the first UL hopping channel of the UL frequency hopping pattern based on a presence of additional UL data. At block 1604, the UE transmits the additional UL data on the first UL hopping channel of the UL frequency hopping pattern.

Figure 17:
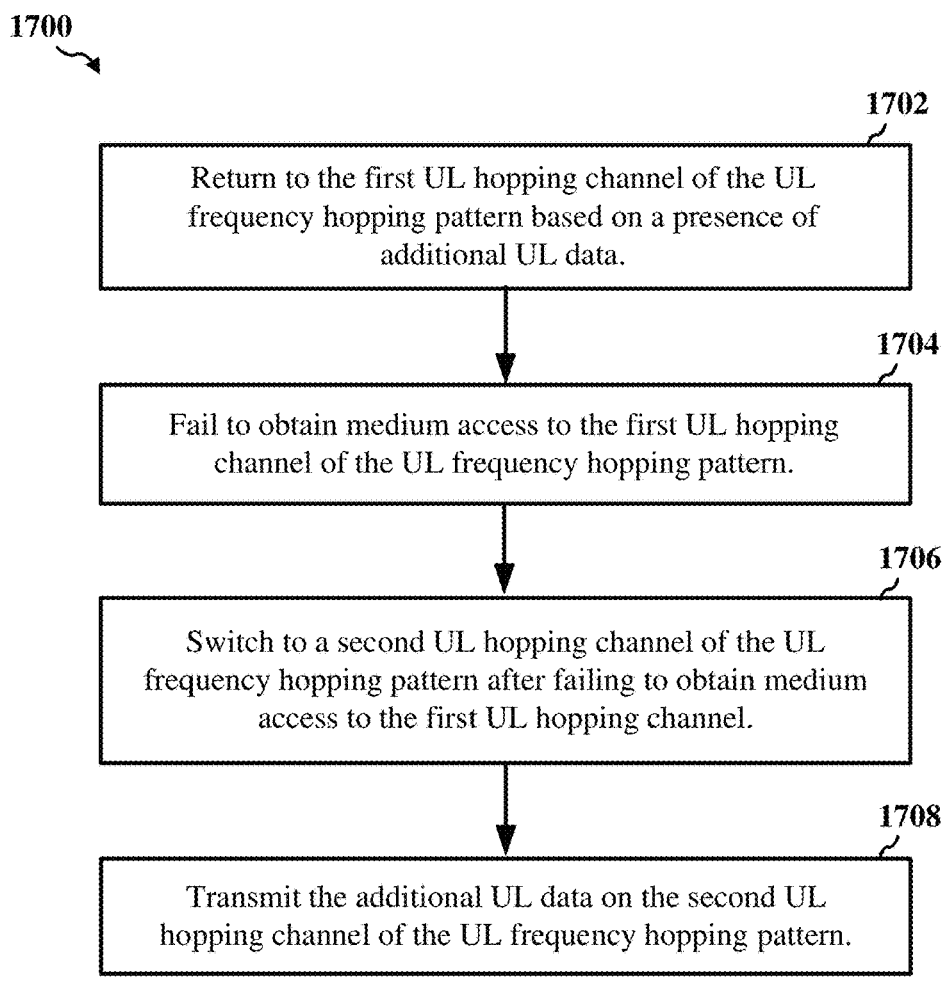
FIG. 17 shows a flowchart depicting an example operation for wireless communication that supports frequency hopping between a base station and a UE.

FIG. 17 shows a flowchart depicting an example operation 1700 for wireless communication that supports frequency hopping between a BS and a UE. The operation 1700 may be performed by an apparatus of a wireless communication device such as the UE 104 of FIG. 1, the UE 350 of FIG. 3, or the UE 404 of FIG. 4. In some implementations, the operation 1700 may begin after monitoring the first DL hopping channel in block 1504 of FIG. 15. For example, in block 1702, the UE returns to the first UL hopping channel of the UL frequency hopping pattern based on a presence of additional UL data. At block 1704, the UE fails to obtain medium access to the first UL hopping channel of the UL frequency hopping pattern. At block 1706, the UE switches to a second UL hopping channel of the UL frequency hopping pattern after failing to obtain medium access to the first UL hopping channel of the UL frequency hopping pattern. At block 1708, the UE transmits the additional UL data on the second UL hopping channel of the UL frequency hopping pattern.

Figure 18:
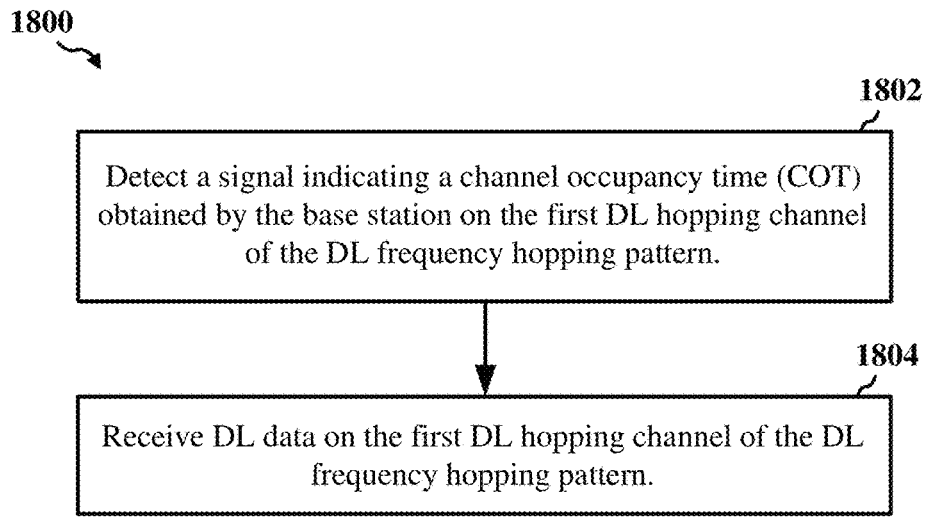
FIG. 18 shows a flowchart depicting an example operation for wireless communication that supports frequency hopping between a base station and a UE.

FIG. 18 shows a flowchart depicting an example operation 1800 for wireless communication that supports frequency hopping between a BS and a UE. The operation 1800 may be performed by an apparatus of a wireless communication device such as the UE 104 of FIG. 1, the UE 350 of FIG. 3, or the UE 404 of FIG. 4. In some implementations, the operation 1800 may begin after jumping to the first DL hopping channel of the DL frequency hopping pattern in block 706 of FIG. 7. For example, in block 1802, the UE detects a signal indicating a channel occupancy time (COT) obtained by the BS on the first DL hopping channel of the DL frequency hopping pattern. At block 1804, the UE receives DL data on the first DL hopping channel of the DL frequency hopping pattern.

In some implementations, the signal indicating the COT in block 1302 may be one or more of a system information channel occupancy time (SI-COT), a group-common physical downlink control channel (GC-PDCCH), or a common transmit preamble. The COT may be obtained based on a CCA operation performed by the BS on the first DL hopping channel of the DL frequency hopping pattern.

Figure 19:
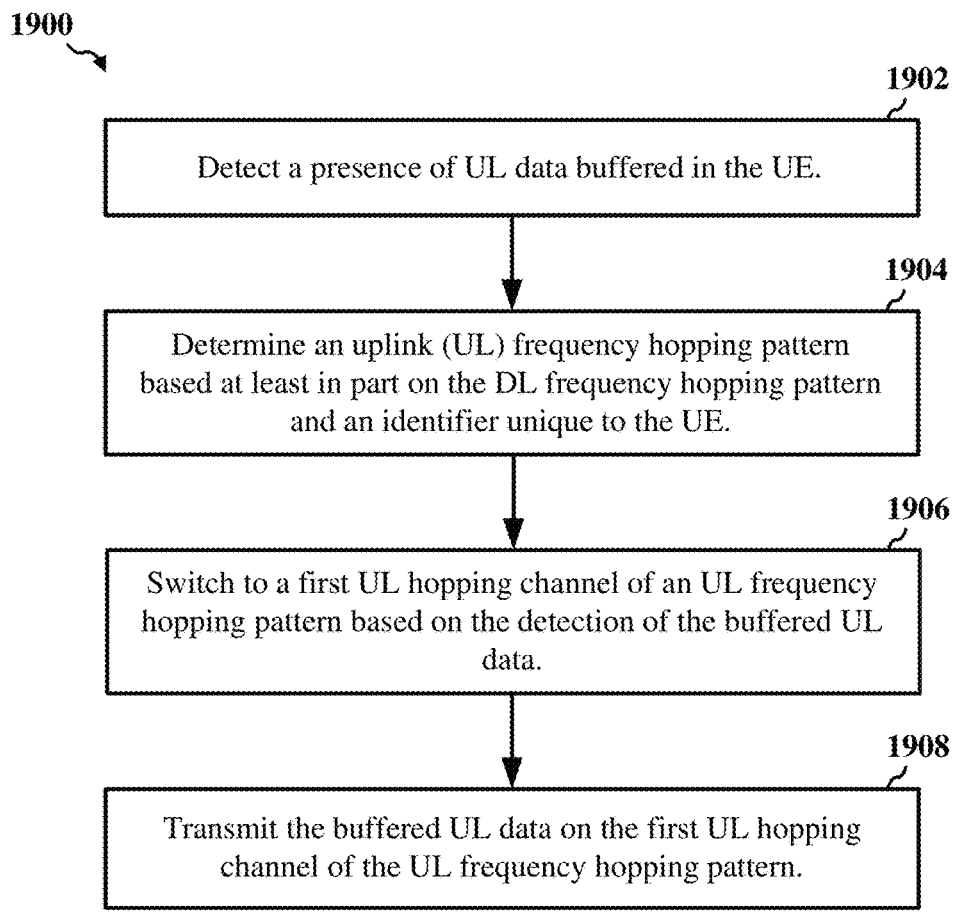
FIG. 19 shows a flowchart depicting an example operation for wireless communication that supports frequency hopping between a base station and a UE.

FIG. 19 shows a flowchart depicting an example operation 1900 for wireless communication that supports frequency hopping between a BS and a UE. The operation 1900 may be performed by an apparatus of a wireless communication device such as the UE 104 of FIG. 1, the UE 350 of FIG. 3, or the UE 404 of FIG. 4. In some implementations, the operation 1900 may begin after receiving the DL data in block 1804 of FIG. 18. For example, in block 1902, the UE detects a presence of UL data buffered in the UE. At block 1904, the UE determines an uplink (UL) frequency hopping pattern based at least in part on the DL frequency hopping pattern and an identifier unique to the UE. At block 1906, the UE switches to a first UL hopping channel of the UL frequency hopping pattern based on the detection of the buffered UL data. At block 1908, the UE transmits the buffered UL data on the first UL hopping channel of the UL frequency hopping pattern.

In some implementations, the DL frequency hopping pattern includes a sequence of DL hopping channels, and the UL frequency hopping pattern includes one or more sequences of UL hopping channels different than the sequence of DL hopping channels. Each DL hopping channel may be associated with a corresponding DL hopping frame of a sequence of DL hopping frames, and each UL hopping channel of a respective sequence of the one or more sequences of UL hopping channels may be associated with a corresponding UL hopping frame of a respective sequence of one or more sequences of UL hopping frames.

In some implementations, the sequence of DL hopping channels and the one or more sequences of UL hopping channels may be uncoordinated relative to each other, for example, to avoid certain FCC restrictions on communications that employ frequency hopping techniques. In some other implementations, the sequence of DL hopping channels and the one or more sequences of UL hopping channels may be coordinated with each other, for example, to reduce a likelihood that UL hopping channels associated with (or assigned to) different UEs do not overlap in both time and frequency. The one or more sequences of UL hopping channels may be orthogonal to each other, and may be orthogonal to the sequence of DL hopping channels. In some implementations, each of the one or more sequences of UL hopping channels may be based on the sequence of DL hopping channels and an identifier unique to the associated UE (such as a UEID).

Implementation examples are described in the following numbered clauses:

1. A method for wireless communication performed by an apparatus of a user equipment (UE), including:
 receiving a discovery reference signal (DRS) including a skipping signal identifying one or more UEs;
 staying on an anchor channel when the skipping signal identifies the UE; and
 switching from the anchor channel to a first downlink (DL) hopping channel of a DL frequency hopping pattern when the signal does not identify the UE.
2. The method of clause 1, where the DRS includes one or more of a primary synchronization signal (PSS), a secondary synchronization signal (SSS), a physical broadcast channel (PBCH), or a system information block (SIB).
3. The method of any of clauses 1-2, where the one or more UEs identified by the skipping signal are permitted to enter a low-power state for one or more DRS periods.
4. The method of any of clauses 1-3, where the skipping signal indicates an absence of queued DL data for each of the one or more identified UEs during one or more DRS periods.
5. The method of clause 1, where the DRS indicates the DL frequency hopping pattern, and is received on the anchor channel.
6. The method of any of clauses 1-5, where the skipping signal is included in a reduced remaining minimum system information (RMSI) field of the DRS, the RMSI field including a bitmap identifying the one or more UEs.
7. The method of clause 6, where the identified UEs are mapped to the bitmap of the RMSI field via a radio resource control (RRC) configuration.
8. The method of any of clauses 1-5, where the skipping signal includes a bitmap identifying one or more groups of UEs that are to stay on the anchor channel for one or more DRS periods.
9. The method of any of clauses 1-5, where the skipping signal is included in a frequency domain resource assignment (FDRA) field of a downlink control information (DCI) message.
10. The method of clause 1, where the skipping signal is indicated by a slot format indicator (SFI) format index carried by the DRS.
11. The method of clause 10, further including:
 detecting a signal indicating a channel occupancy time (COT) obtained by a base station on the first DL hopping channel of the DL frequency hopping pattern; and
 receiving DL data on the first DL hopping channel of the DL frequency hopping pattern.
12. The method of any of clauses 1-11, further including:
 detecting a presence of uplink (UL) data buffered in the UE;
 selecting an UL frequency hopping pattern based at least in part on the DL frequency hopping pattern and an identifier unique to the UE;
 switching to a first UL hopping channel of the UL frequency hopping pattern based on detecting the presence of the buffered UL data; and
 transmitting the buffered UL data on the first UL hopping channel of the UL frequency hopping pattern.
13. The method of clause 12, where the first UL hopping channel of the UL frequency hopping pattern corresponds to one of a configured grant (CG) configuration or a physical random access channel (PRACH).
14. The method of any of clauses 12-13, further including:
 returning to the first DL hopping channel of the DL frequency hopping pattern; and
 monitoring the first DL hopping channel of the DL frequency hopping pattern for one of an UL re-transmission grant or a random access response (RAR).

15. A wireless communication device, including:
a processing system; and
an interface configured to:
   obtain a discovery reference signal (DRS) including a skipping signal identifying one or more UEs;
   stay on an anchor channel when the skipping signal identifies the UE; and
   switch from the anchor channel to a first downlink (DL) hopping channel of a DL frequency hopping pattern when the signal does not identify the UE.
16. The wireless communication device of clause 15, where the DRS indicates the DL frequency hopping pattern, and is received on the anchor channel.
17. The wireless communication device of any of clauses 15-16, where the skipping signal is included in a reduced remaining minimum system information (RMSI) field of the DRS, the RMSI field including a bitmap identifying the one or more UEs.
18. The wireless communication device of any of clauses 15-16, where the skipping signal is included in a frequency domain resource assignment (FDRA) field of a downlink control information (DCI) message.
19. The wireless communication device of claim 15, where the skipping signal indicates an absence of queued DL data for each of the one or more identified UEs during one or more DRS periods.
20. The wireless communication device of any of clauses 15-18, where:
the processing system is configured to:
   detect a presence of uplink (UL) data buffered in the UE; and
   determine an UL frequency hopping pattern based at least in part on the DL frequency hopping pattern and an identifier unique to the UE; and
the interface is further configured to:
   switch to a first UL hopping channel of the UL frequency hopping pattern based on detecting the presence of the buffered UL data; and
   output the buffered UL data for transmission on the first UL hopping channel of the UL frequency hopping pattern.
21. The wireless communication device of clause 15, where:
the processing system is further configured to:
detect a signal indicating a channel occupancy time (COT) obtained by a base station on the first DL hopping channel of the DL frequency hopping pattern; and
the interface is further configured to:
obtain DL data on the first DL hopping channel of the DL frequency hopping pattern.
22. A method for wireless communication performed by an apparatus of a base station (BS), including:
transmitting a discovery reference signal (DRS) including a skipping signal identifying one or more user equipment (UEs);
transmitting a signal indicating a channel occupancy time (COT) obtained on a first downlink (DL) hopping channel of a DL frequency hopping pattern; and
transmitting DL data on the first DL hopping channel of the DL frequency hopping pattern.
23. The method of clause 22, where the DRS is transmitted on an anchor channel of an unlicensed frequency band and indicates the DL frequency hopping pattern.
24. The method of any of clauses 22-23, where the skipping signal indicates an absence of queued DL data for each of the one or more identified UEs during one or more DRS periods.
25. The method of any of clauses 22-24, where the one or more UEs identified by the skipping signal are permitted to enter a low-power state for one or more DRS periods.
26. The method of any of clauses 22-25, further including receiving uplink (UL) data from a UE on a first UL hopping channel of an UL frequency hopping pattern.
27. The method of clause 26, where the first UL hopping channel of the UL frequency hopping pattern corresponds to one of a configured grant (CG) configuration or a physical random access channel (PRACH).
28. A wireless communication device including an interface configured to:
output for transmission a discovery reference signal (DRS) including a skipping signal identifying one or more user equipment (UEs);
output for transmission a signal indicating a channel occupancy time (COT) obtained on a first downlink (DL) hopping channel of a DL frequency hopping pattern; and
output for transmission DL data on the first DL hopping channel of the DL frequency hopping pattern.
29. The wireless communication device of clause 28, where the skipping signal is included in a reduced remaining minimum system information (RMSI) field of the DRS, and the RMSI field includes a bitmap identifying the one or more UEs or one or more groups of UEs.
30. The wireless communication device of any of clauses 28-29, where the interface is further configured to obtain uplink (UL) data from a UE on a first UL hopping channel of an UL frequency hopping pattern.
31. A method for wireless communication performed by an apparatus of a user equipment (UE), including:
receiving a discovery reference signal (DRS) indicating a downlink (DL) frequency hopping pattern and including a skipping signal indicating a time period during which one or more UEs are to skip frequency hopping between an anchor channel and DL hopping channels of the DL frequency hopping pattern;
determining whether the skipping signal identifies the UE; and
selectively switching to a first DL hopping channel of the DL frequency hopping pattern based on the determination.
32. The method of clause 31, where the DRS includes one or more of a primary synchronization signal (PSS), a secondary synchronization signal (SSS), a physical broadcast channel (PBCH), or a system information block (SIB).
33. The method of any of clauses 31-32, where the time period includes a number of the DL hopping channels.
34. The method of any of clauses 31-32, where the time period includes a number of DRS periods.
35. The method of any of clauses 31-32, where the time period includes a portion of a DRS period.
36. The method of any of clauses 31-35, where the skipping signal indicates an absence of DL data for the one or more UEs during the time period.
37. The method of any of clauses 31-32, where the skipping signal is included in a reduced remaining minimum system information (RMSI) field of the DRS.

38. The method of clause 37, where the RMSI field includes a bitmap identifying the one or more UEs that are to skip frequency hopping between the anchor channel and the DL hopping channels.
39. The method of clause 38, where each bit of the bitmap identifies a corresponding UE of the one or more identified UEs.
40. The method of clause 37, where the skipping signal includes a bitmap identifying one or more groups of UEs that are to skip frequency hopping between the anchor channel and the DL hopping channels.
41. The method of clause 40, where each bit of the bitmap identifies a group of UEs that are to skip frequency hopping between the anchor channel and the DL hopping channels.
42. The method of clause 41, where the identified groups of UEs are mapped to the bitmap of the RMSI field via a radio resource control (RRC) configuration.
43. The method of clause 31, where the skipping signal is carried in a downlink control information (DCI) message received from a base station.
44. The method of clause 43, where the skipping signal is contained in a frequency domain resource assignment (FDRA) field of the DCI message.
45. The method of clause 43, where the DCI message is configured in a Type3 common search space.
46. The method of clause 31, where the skipping signal is included in a slot format indicator (SFI) carried by the DRS.
47. The method of clause 46, where the skipping signal is contained in a reserved slotFormat ID of the SFI.
48. The method of clause 46, where the skipping signal is indicated by an SFI format index.
49. The method of any of clauses 31-48, where the selectively switching includes staying on the anchor channel for a duration in response to determining that the skipping signal identifies the UE.
50. The method of clause 49, further including:
detecting a presence of UL data buffered in the UE;
determining an uplink (UL) frequency hopping pattern based at least in part on the DL frequency hopping pattern and an identifier unique to the UE;
switching to a first UL hopping channel of the UL frequency hopping pattern based on the detection of the buffered UL data; and
transmitting the buffered UL data on the first UL hopping channel of the UL frequency hopping pattern.
51. The method of clause 50, where the first UL hopping channel of the UL frequency hopping pattern corresponds to one of a configured grant (CG) configuration or a physical random access channel (PRACH).
52. The method of any of clauses 50-51, further including:
returning to the first DL hopping channel of the DL frequency hopping pattern; and
monitoring the first DL hopping channel of the DL frequency hopping pattern for one of an UL re-transmission grant or a random access response (RAR).
53. The method of clause 52, further including:
returning to the first UL hopping channel of the UL frequency hopping pattern based on a presence of additional UL data; and
transmitting the additional UL data on the first UL hopping channel of the UL frequency hopping pattern.
54. The method of clause 52, further including:
returning to the first UL hopping channel of the UL frequency hopping pattern based on a presence of additional UL data;
failing to obtain medium access to the first UL hopping channel of the UL frequency hopping pattern;
switching to a second UL hopping channel of the UL frequency hopping pattern after failing to obtain medium access to the first UL hopping channel of the UL frequency hopping pattern; and
transmitting the additional UL data on the second UL hopping channel of the UL frequency hopping pattern.
55. The method of any of clauses 31-54, where the selectively switching includes jumping to the first DL hopping channel of the DL frequency hopping pattern in response to determining that the skipping signal does not identify the UE.
56. The method of clause 55, further including:
detecting a signal indicating a channel occupancy time (COT) obtained by a base station on the first DL hopping channel of the DL frequency hopping pattern; and
receiving DL data on the first DL hopping channel of the DL frequency hopping pattern.
57. The method of clause 56, where the signal includes one or more of a system information channel occupancy time (SI-COT), a group-common physical downlink control channel (GC-PDCCH), or a common transmit preamble.
58. The method of any of clauses 31-57, further including:
detecting a presence of UL data buffered in the UE;
determining an uplink (UL) frequency hopping pattern based at least in part on the DL frequency hopping pattern and an identifier unique to the UE;
switching to a first UL hopping channel of the UL frequency hopping pattern based on the detection of the buffered UL data; and
transmitting the buffered UL data on the first UL hopping channel of the UL frequency hopping pattern.
59. The method of clause 58, where the DL frequency hopping pattern includes a sequence of DL hopping channels, and the UL frequency hopping pattern includes a sequence of UL hopping channels different than the sequence of DL hopping channels.
60. The method of clause 59, where:
DL hopping channel of the sequence of DL hopping channels is associated with a corresponding DL hopping frame of a sequence of DL hopping frames;
each UL hopping channel of the sequence of UL hopping channels is associated with a corresponding UL hopping frame of a sequence of UL hopping frames;
one or more of the DL hopping frames of the sequence of DL hopping frames contains DL data for at least one wireless communication device other than the UE; and
each UL hopping frame of the sequence of UL hopping frames is dedicated for UL transmissions from the UE.
61. The method of any of clauses 31-60, where the DRS is transmitted on the anchor channel.
62. A user equipment (UE), including:
one or more processors; and
a memory coupled to the one or more processors and storing instructions that, when executed by the one or more processors, cause the UE to perform the operations of any one or more of clauses 31-61.
63. A user equipment (UE) including means for performing the operations of any one or more of clauses 31-61.
64. A non-transitory computer-readable memory including instructions that, when executed by one or more processors of a user equipment (UE), cause the UE to perform the operations of any one or more of clauses 31-61.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by an apparatus of a user equipment (UE), comprising:
   receiving a discovery reference signal (DRS) comprising a remaining minimum system information (RMSI) field that includes a bitmap identifying one or more UEs that are to skip frequency hopping for a duration indicated by a skipping signal;
   staying on an anchor channel for the duration indicated by the skipping signal when the bitmap identifies the UE; and
   switching from the anchor channel to a first downlink (DL) hopping channel of a DL frequency hopping pattern when the bitmap does not identify the UE.

2. The method of claim 1, wherein the DRS includes one or more of a primary synchronization signal (PSS), a secondary synchronization signal (SSS), a physical broadcast channel (PBCH), or a system information block (SIB).

3. The method of claim 1, wherein the one or more UEs identified by the bitmap are permitted to enter a low-power state for one or more DRS periods.

4. The method of claim 1, wherein the skipping signal indicates an absence of queued DL data for each of the one or more identified UEs during one or more DRS periods.

5. The method of claim 1, wherein the DRS indicates the DL frequency hopping pattern, and is received on the anchor channel.

6. The method of claim 1, wherein the one or more identified UEs are mapped to the bitmap of the RMSI field via a radio resource control (RRC) configuration.

7. The method of claim 1, wherein the bitmap identifies one or more groups of UEs that are to stay on the anchor channel for one or more DRS periods.

8. The method of claim 1, wherein the skipping signal is included in a frequency domain resource assignment (FDRA) field of a downlink control information (DCI) message.

9. The method of claim 1, wherein the skipping signal is indicated by a slot format indicator (SFI) format index carried by the DRS.

10. The method of claim 9, further comprising:
    detecting a signal indicating a channel occupancy time (COT) obtained on the first DL hopping channel of the DL frequency hopping pattern; and
    receiving DL data on the first DL hopping channel of the DL frequency hopping pattern.

11. The method of claim 1, further comprising:
    detecting a presence of uplink (UL) data buffered in the UE;
    selecting an UL frequency hopping pattern associated with the DL frequency hopping pattern and an identifier unique to the UE;

switching to a first UL hopping channel of the UL frequency hopping pattern based on detecting the presence of the buffered UL data; and
transmitting the buffered UL data on the first UL hopping channel of the UL frequency hopping pattern.

12. The method of claim 11, wherein the first UL hopping channel of the UL frequency hopping pattern corresponds to one of a configured grant (CG) configuration or a physical random access channel (PRACH).

13. The method of claim 11, further comprising:
returning to the first DL hopping channel of the DL frequency hopping pattern; and
monitoring the first DL hopping channel of the DL frequency hopping pattern for one of an UL re-transmission grant or a random access response (RAR).

14. A wireless communication device, comprising:
a processing system; and
an interface configured to:
obtain a discovery reference signal (DRS) comprising a remaining minimum system information (RMSI) field that includes a bitmap identifying one or more user equipment (UEs) that are to skip frequency hopping for a duration indicated by a skipping signal;
stay on an anchor channel for the duration indicated by the skipping signal when the bitmap identifies the wireless communication device; and
switch from the anchor channel to a first downlink (DL) hopping channel of a DL frequency hopping pattern when the bitmap does not identify the wireless communication device.

15. The wireless communication device of claim 14, wherein the DRS indicates the DL frequency hopping pattern, and is received on the anchor channel.

16. The wireless communication device of claim 14, wherein the skipping signal is included in a frequency domain resource assignment (FDRA) field of a downlink control information (DCI) message.

17. The wireless communication device of claim 14, wherein the skipping signal indicates an absence of queued DL data for each of the one or more identified UEs during one or more DRS periods.

18. The wireless communication device of claim 14, wherein:
the processing system is configured to:
detect a presence of uplink (UL) data buffered in the wireless communication device;
determine an UL frequency hopping pattern associated with the DL frequency hopping pattern and an identifier unique to the wireless communication device; and
switch to a first UL hopping channel of the UL frequency hopping pattern based on detecting the presence of the buffered UL data; and
the interface is further configured to:
output the buffered UL data for transmission on the first UL hopping channel of the UL frequency hopping pattern.

19. The wireless communication device of claim 14, wherein:
the processing system is further configured to:
detect a signal indicating a channel occupancy time (COT) obtained on the first DL hopping channel of the DL frequency hopping pattern; and
the interface is further configured to:
obtain DL data on the first DL hopping channel of the DL frequency hopping pattern.

20. A method for wireless communication performed by an apparatus, comprising:
transmitting a discovery reference signal (DRS) comprising a remaining minimum system information (RMSI) field that includes a bitmap identifying one or more user equipment (UEs) that are to skip frequency hopping and stay on an anchor channel for a duration indicated by a skipping signal;
transmitting, to at least a first UE different from the one or more UEs identified by the bitmap, a signal indicating a channel occupancy time (COT) obtained on a first downlink (DL) hopping channel of a DL frequency hopping pattern; and
transmitting, to at least the first UE, DL data on the first DL hopping channel of the DL frequency hopping pattern.

21. The method of claim 20, wherein the DRS is transmitted on an anchor channel of an unlicensed frequency band and indicates the DL frequency hopping pattern.

22. The method of claim 20, wherein the skipping signal indicates an absence of queued DL data for each of the one or more identified UEs during one or more DRS periods.

23. The method of claim 20, wherein the one or more UEs identified by the bitmap are permitted to enter a low-power state for one or more DRS periods.

24. The method of claim 20, further comprising receiving uplink (UL) data from a second UE on a first UL hopping channel of an UL frequency hopping pattern.

25. The method of claim 24, wherein the first UL hopping channel of the UL frequency hopping pattern corresponds to one of a configured grant (CG) configuration or a physical random access channel (PRACH).

26. A wireless communication device comprising:
a processing system; and
an interface configured to:
output for transmission, a discovery reference signal (DRS) comprising a remaining minimum system information (RMSI) field that includes a bitmap identifying one or more user equipment (UEs) that are to skip frequency hopping and stay on an anchor channel for a duration indicated by a skipping signal;
output for transmission, to at least a first UE different from the one or more UEs identified by the bitmap, a signal indicating a channel occupancy time (COT) obtained on a first downlink (DL) hopping channel of a DL frequency hopping pattern; and
output for transmission, to at least the first UE, DL data on the first DL hopping channel of the DL frequency hopping pattern.

27. The wireless communication device of claim 26, wherein the interface is further configured to obtain uplink (UL) data from a second UE on a first UL hopping channel of an UL frequency hopping pattern.

* * * * *